US012607821B2

(12) United States Patent
Chen et al.

(10) Patent No.: US 12,607,821 B2
(45) Date of Patent: *Apr. 21, 2026

(54) IMAGING LENS DRIVING MODULE, IMAGE CAPTURING APPARATUS AND ELECTRONIC DEVICE

(71) Applicant: LARGAN DIGITAL CO., LTD., Taichung City (TW)

(72) Inventors: Hao-Jan Chen, Taichung City (TW); Heng-Yi Su, Taichung City (TW); Ming-Ta Chou, Taichung City (TW); Chen-Yi Huang, Taichung City (TW); Ming-Shun Chang, Taichung City (TW)

(73) Assignee: LARGAN DIGITAL CO., LTD., Taichung City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,417

(22) Filed: Sep. 13, 2024

(65) Prior Publication Data

US 2025/0004242 A1 Jan. 2, 2025

Related U.S. Application Data

(63) Continuation of application No. 17/412,576, filed on Aug. 26, 2021, now Pat. No. 12,117,666.

(Continued)

(51) Int. Cl.
*G02B 7/08* (2021.01)
*G02B 7/09* (2021.01)
(Continued)

(52) U.S. Cl.
CPC .................. *G02B 7/08* (2013.01); *G02B 7/09* (2013.01); *G02B 13/001* (2013.01); *G03B 5/02* (2013.01);
(Continued)

(58) Field of Classification Search
CPC ...... G02B 27/646; G02B 6/3514; G02B 7/08; G02B 7/09; G02B 7/182; G02B 15/173;
(Continued)

(56) References Cited

U.S. PATENT DOCUMENTS 8,582,222 B2 11/2013 Huang et al.
9,319,573 B2 4/2016 Oh
(Continued)

FOREIGN PATENT DOCUMENTS

CN 102486566 A 6/2012
CN 103238109 A 8/2013
(Continued)

*Primary Examiner* — Stephone B Allen
*Assistant Examiner* — Tamara Y. Washington
(74) *Attorney, Agent, or Firm* — McClure, Qualey & Rodack, LLP

(57) ABSTRACT

An imaging lens driving module includes a lens carrier, a molded receiving base, a rolling element, a molded frame element and a driving mechanism. The lens carrier defines an optical axis. The molded receiving base is configured to receive the lens carrier. The rolling element is disposed between the lens carrier and the molded receiving base, and the lens carrier is allowed to be displaceable along the optical axis and relatively to the molded receiving base. The molded frame element is coupled with the molded receiving base for defining an inner space to receive the lens carrier. The driving mechanism drives the lens carrier displaceable along the optical axis, and includes a driving magnet and a driving coil, wherein the driving magnet is disposed on the lens carrier, the driving coil is corresponding to and faces towards the driving magnet.

15 Claims, 26 Drawing Sheets

Related U.S. Application Data

(60) Provisional application No. 63/090,310, filed on Oct. 12, 2020.

(51) Int. Cl.
| | |
|---|---|
| *G02B 13/00* | (2006.01) |
| *G03B 5/02* | (2021.01) |
| *G03B 17/02* | (2021.01) |

(52) U.S. Cl.
CPC ...... *G03B 17/02* (2013.01); *G03B 2205/0069* (2013.01)

(58) Field of Classification Search
CPC ...... G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H02K 41/0356; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55

See application file for complete search history.

(56) References Cited

U.S. PATENT DOCUMENTS

| | | | |
|---|---|---|---|
| 10,422,932 B2 | 9/2019 | Chou et al. | |
| 10,908,415 B2 | 2/2021 | Chang et al. | |
| 11,016,221 B2 | 5/2021 | Chou et al. | |
| 12,117,666 B2* | 10/2024 | Chen ...................... G03B 5/02 |
| 2018/0367714 A1 | 12/2018 | Im | |
| 2021/0063680 A1* | 3/2021 | Kim ...................... G03B 13/36 |

FOREIGN PATENT DOCUMENTS

| | | |
|---|---|---|
| CN | 110109228 A | 8/2019 |
| TW | I665474 B | 7/2019 |
| TW | I667507 B | 8/2019 |
| TW | I704385 B | 9/2020 |

* cited by examiner

10

10

121

120

171

170

231

230

233

232

230

233

231

230

232

230

233

234

233

234

IMAGING LENS DRIVING MODULE, IMAGE CAPTURING APPARATUS AND ELECTRONIC DEVICE

RELATED APPLICATIONS

The present application is a continuation of the application Ser. No. 17/412,576, filed Aug. 26, 2021, now U.S. Pat. No. 12,117,666, which claims priority to U.S. Provisional Application Ser. No. 63/090,310, filed Oct. 12, 2020, which is herein incorporated by reference.

BACKGROUND

Technical Field

The present disclosure relates to an imaging lens driving module and an image capturing apparatus. More particularly, the present disclosure relates to an imaging lens driving module and an image capturing apparatus applicable to portable electronic devices.

Description of Related Art

In recent years, portable electronic devices have developed rapidly. For example, intelligent electronic devices and tablets have been filled in the lives of modern people, and image capturing apparatuses and imaging lens driving modules thereof mounted on portable electronic devices have also prospered. However, as technology advances, the quality requirements of the imaging lens driving modules are becoming higher and higher. Therefore, an imaging lens driving module, which has the higher rigidity and can effectively control the warpage and the abnormal contraction, needs to be developed.

SUMMARY

According to one aspect of the present disclosure, an imaging lens driving module includes a lens carrier, a molded receiving base, a rolling element, a molded frame element and a driving mechanism. The lens carrier defines an optical axis. The molded receiving base is configured to receive the lens carrier. The rolling element is disposed between the lens carrier and the molded receiving base, and the lens carrier is allowed to be displaceable along the optical axis and relatively to the molded receiving base. The molded frame element is coupled with the molded receiving base for defining an inner space to receive the lens carrier. The driving mechanism drives the lens carrier displaceable along the optical axis, and includes a driving magnet and a driving coil, wherein the driving magnet is disposed on the lens carrier, and the driving coil is corresponding to and faces towards the driving magnet. The lens carrier includes a lateral surface facing towards the molded receiving base. The molded receiving base includes a metal element with an iron composition, the metal element is insert-molded with the molded receiving base, the metal element is forming a ring-shaped plane, and the ring-shaped plane faces towards the lateral surface.

According to one aspect of the present disclosure, an image capturing apparatus includes the imaging lens driving module of the aforementioned aspect and an imaging lens assembly, wherein the imaging lens assembly is disposed in the lens carrier of the imaging lens driving module.

According to one aspect of the present disclosure, an electronic device includes the image capturing apparatus of the aforementioned aspect and an image sensor, wherein the image sensor is disposed on an image surface of the imaging lens assembly.

According to one aspect of the present disclosure, an imaging lens driving module includes a lens carrier, a molded receiving base, a rolling element, a molded frame element and a driving mechanism. The lens carrier defines an optical axis. The molded receiving base is configured to receive the lens carrier. The rolling element is disposed between the lens carrier and the molded receiving base, and the lens carrier is allowed to be displaceable along the optical axis and relatively to the molded receiving base. The molded frame element is coupled with the molded receiving base for defining an inner space to receive the lens carrier. The driving mechanism drives the lens carrier displaceable along the optical axis, and includes a driving magnet and a driving coil, wherein the driving magnet is disposed on the lens carrier, and the driving coil is corresponding to and faces towards the driving magnet. The lens carrier includes a lateral surface facing towards the molded frame element. The molded frame element includes a metal element with an iron composition, the metal element is insert-molded with the molded frame element, the metal element is forming a ring-shaped plane, and the ring-shaped plane faces towards the lateral surface.

According to one aspect of the present disclosure, an imaging lens driving module includes a lens carrier, a molded receiving base, a rolling element, a molded frame element and a driving mechanism. The lens carrier defines an optical axis. The molded receiving base is configured to receive the lens carrier. The rolling element is disposed between the lens carrier and the molded receiving base, and the lens carrier is allowed to be displaceable along the optical axis and relatively to the molded receiving base. The molded frame element is coupled with the molded receiving base for defining an inner space to receive the lens carrier. The driving mechanism drives the lens carrier displaceable along the optical axis, and includes a driving magnet and a driving coil, wherein the driving magnet is disposed on the lens carrier, and the driving coil is corresponding to and faces towards the driving magnet. The lens carrier includes a metal element with an iron composition, the metal element is insert-molded with the lens carrier, the metal element is forming a ring-shaped plane, and the ring-shaped plane faces towards one of the molded receiving base and the molded frame element. A portion of the metal element is corresponding to the driving magnet disposed on the lens carrier, and the portion of the metal element faces towards the driving magnet.

According to one aspect of the present disclosure, an image capturing apparatus includes the imaging lens driving module of the aforementioned aspect and an imaging lens assembly, wherein the imaging lens assembly is disposed in the lens carrier of the imaging lens driving module.

BRIEF DESCRIPTION OF THE DRAWINGS

FIG. 2C is a partial schematic view of the imaging lens driving module according to the 2nd example in FIG. 2A, wherein FIG. 2C is a schematic view observing along a direction of an arrow in FIG. 2B.

FIG. 3B is a partial enlarged view of the imaging lens driving module according to the 3rd example in FIG. 3A, wherein FIG. 3B is a schematic view observing along a direction of an arrow in FIG. 3A.

FIG. 3C is another partial enlarged view of the imaging lens driving module according to the 3rd example in FIG. 3A, wherein FIG. 3C is a schematic view of FIG. 3B with an X axis rotated by 8 degrees and a Z axis rotated by −2 degrees.

FIG. 4B is a partial enlarged view of the imaging lens driving module according to the 4th example in FIG. 4A, wherein FIG. 4B is a schematic view observing along a direction of an arrow in FIG. 4A.

FIG. 4C is another partial enlarged view of the imaging lens driving module according to the 4th example in FIG. 4A, wherein FIG. 4C is a schematic view of FIG. 4B with an X axis rotated by 2 degrees and a Z axis rotated by −3 degrees.

DETAILED DESCRIPTION

Figure 1A:
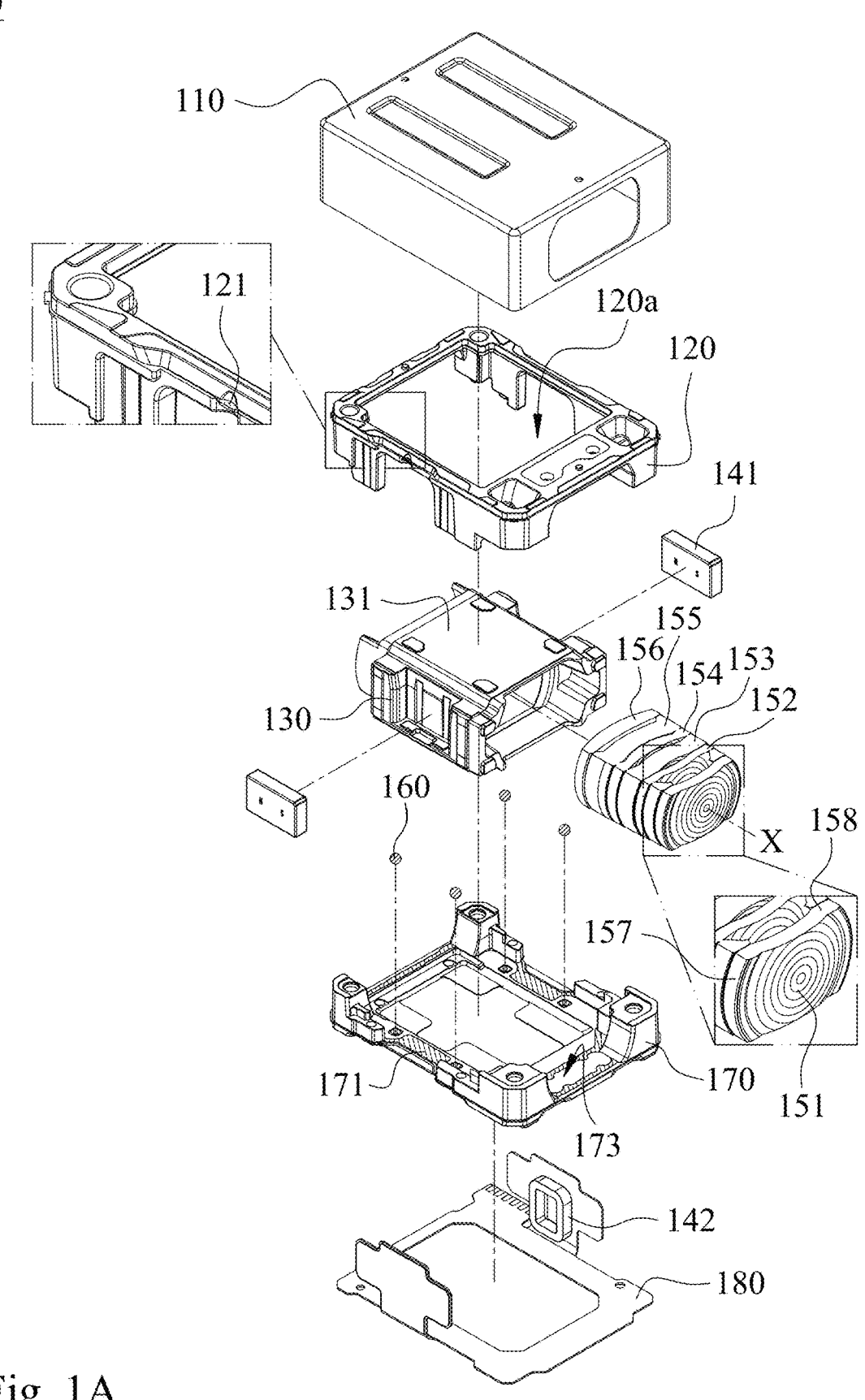
FIG. 1A is an exploded view of an image capturing apparatus according to the 1st example of the present disclosure.

The present disclosure provides an imaging lens driving module, which includes a lens carrier, a molded receiving base, a rolling element, a molded frame element and a driving mechanism. The lens carrier defines an optical axis. The molded receiving base is configured to receive the lens carrier. The rolling element is disposed between the lens carrier and the molded receiving base, and the lens carrier is allowed to be displaceable along the optical axis and relatively to the molded receiving base. The molded frame element is coupled with the molded receiving base for defining an inner space to receive the lens carrier. The driving mechanism drives the lens carrier displaceable along the optical axis, and includes a driving magnet and a driving coil, wherein the driving magnet is disposed on the lens carrier, and the driving coil is corresponding to and faces towards the driving magnet. One of the molded receiving base, the molded frame element and the lens carrier includes a metal element, wherein the metal element is insert-molded with one of the molded receiving base, the molded frame element and the lens carrier, and the metal element is forming a ring-shaped plane.

By the metal element insert-molded with one of the molded receiving base, the molded frame element and the lens carrier, the engineering issues such as the warpage, the abnormal contraction, the insufficient strength and the insufficient rigidity of the plastic element can be effectively controlled during the mass production. It should be mentioned that the warpage, the abnormal contraction, the insufficient strength and the insufficient rigidity are easily happened to the plastic element of the conventional art. By insert-molding the metal element, the mass production finished product (that is, the imaging lens driving module) has the significant advantage to smoothly pass the inspection standards for the following environmental test.

The metal element is with an iron composition, and the proportion of the iron composition is not less than 90%, wherein the metal element is further doped with a little carbon or tungsten to enhance the hardness of the metal element or increase the application range of the metal element. In detail, the metal element can be a carbon-containing steel, an iron material with the treatment of enhancing the hardness, a stainless steel or an iron material with ferromagnetism. Further, the metal element is the iron material, which the magnetic performance can be affected by the magnet, and the characteristic of the metal element can be paramagnetic, ferromagnetic or magnetizable, but the present disclosure is not limited thereto. The metal element can be an electrically conductive wire.

The molded receiving base can be a receiving base formed by injecting the plastic material in the mold of the injection molding.

The lens carrier can include a lateral surface, wherein the lateral surface can face towards the molded receiving base or the molded frame element, and the ring-shaped plane can face towards the lateral surface. Or, the ring-shaped plane can face towards one of the molded receiving base and the molded frame element, a portion of the metal element is corresponding to and faces towards the driving magnet disposed on the lens carrier.

The metal element can be ferromagnetic. By the greater attractive force of the metal element towards the magnet, the assembling error can be effectively reduced. The aforementioned assembling error can be the problem of the insufficient output force of the machine pressing the components during the manufacturing process. In particular, ferromagnetic means that the attractive force between the magnet and the metal element is formed when the magnet is close to the metal element.

The portion of the metal element can be corresponding to and face towards the driving magnet. Because the metal element is ferromagnetic, the attractive force can be formed during the metal element facing towards the driving magnet. Therefore, the preload force of the mechanical system can be maintained by the lens carrier and the molded receiving base close to each other.

Further, the portion of the metal element insert-molded with the molded receiving base and the portion of the metal element insert-molded with the molded frame element can face towards the lens carrier to form a collision reduction mechanism for limiting a moving distance of the lens carrier along the optical axis, and the portion of the metal element and the lens carrier are arranged in order parallel to the optical axis. Or, another portion of the metal element insert-molded with the lens carrier can face towards one of the molded receiving base and the molded frame element to form the collision reduction mechanism for limiting the moving distance of the lens carrier along the optical axis, and another portion of the metal element and one of the molded receiving base and the molded frame element are arranged in order parallel to the optical axis. Therefore, the interference and the collision damage inside the imaging lens driving module can be reduced, and the abnormal sound of the driving mechanism during operating can be reduced.

The ring-shaped plane can include two or more closed rings. The closed rings are favorable for maintaining the flatness of the ring-shaped plane, and the flatness of the metal element insert-molded with the molded receiving base, the molded frame element or the lens carrier is hardly damaged during the manufacturing process. Therefore, both of the dimensional accuracy and the structural strength of the molded frame element and the molded receiving base can be better.

The metal element can include a fold structure, and the fold structure is angled and in a striped shape. Moreover, the supporting strength of the metal element with the fold structure is higher than the supporting strength of the flat metal element without the fold structure, and the thickness of the metal element can be further reduced to enhance the efficiency of the injection molding of the insert-molding. Therefore, the weight of the metal element and the volume of the metal element can be simultaneously reduced under the premise of enhancing the supporting strength. In particular, the angle of the fold structure can be 90 degrees, but the present disclosure is not limited thereto.

Each of the aforementioned features of the imaging lens driving module can be utilized in various combinations for achieving the corresponding effects.

The present disclosure provides an image capturing apparatus, which includes the aforementioned imaging lens driving module and an imaging lens assembly. The imaging lens assembly is disposed in the lens carrier of the imaging lens driving module. Moreover, the imaging lens assembly can include a plurality of lens elements disposed in the lens carrier, and a portion of a peripheral portion of each of the lens elements, which is vertical to the optical axis, is removed to form a removed portion of each of the lens elements. Therefore, the entire volume of the image capturing apparatus can be reduced, and the unnecessary reflection of the stray light inside the image capturing apparatus can be effectively reduced.

The present disclosure provides an electronic device, which includes the aforementioned image capturing apparatus and an image sensor. The image sensor is disposed on an image surface of the imaging lens assembly.

According to the aforementioned embodiment, specific examples are provided, and illustrated via figures.

1st Example

Figure 1B:
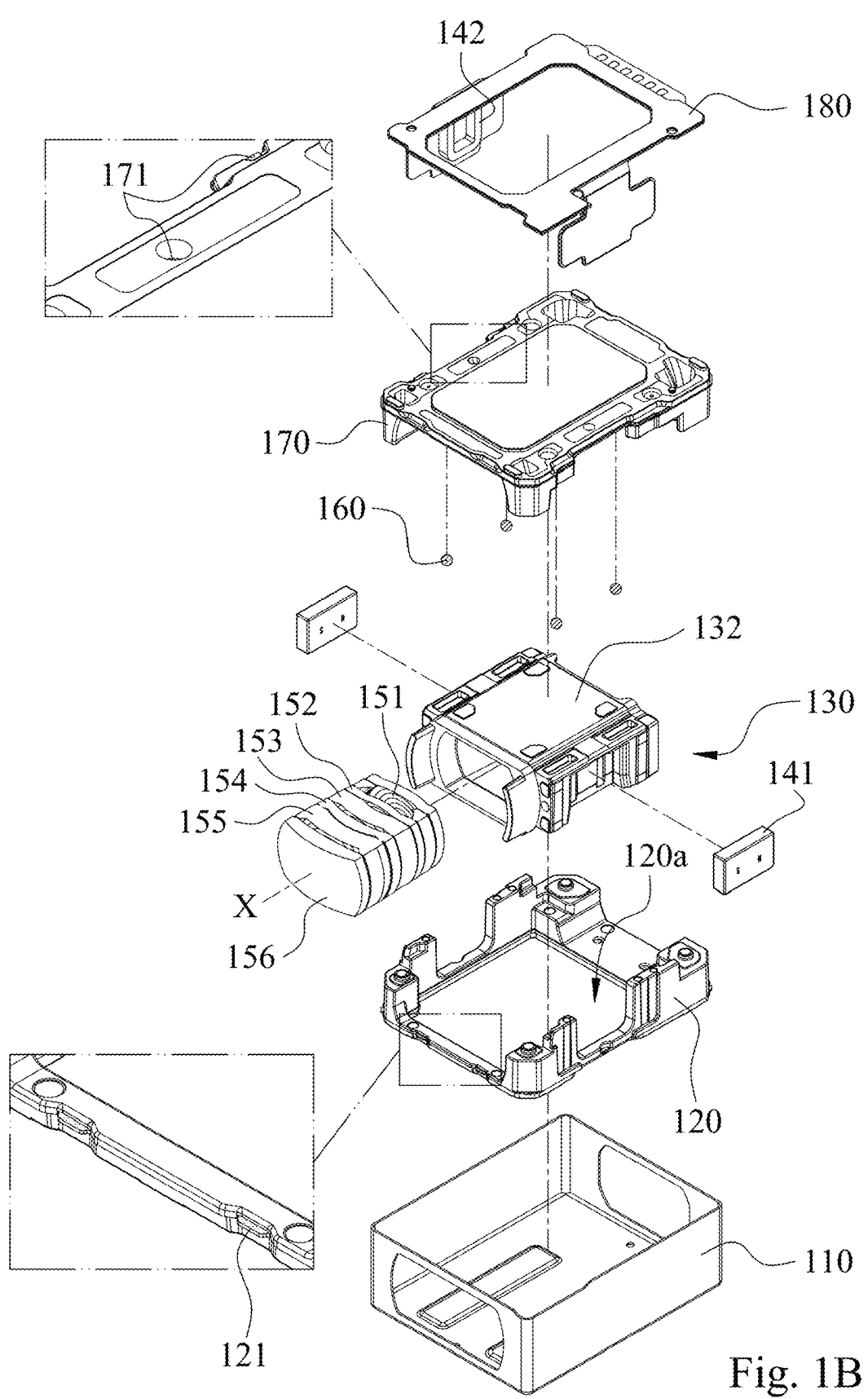
FIG. 1B is another exploded view of the image capturing apparatus according to the 1st example in FIG. 1A.

FIG. 1A is an exploded view of an image capturing apparatus 10 according to the 1st example of the present disclosure. FIG. 1B is another exploded view of the image capturing apparatus 10 according to the 1st example in FIG. 1A. In FIGS. 1A and 1B, the image capturing apparatus 10 includes a cover 110, an imaging lens driving module (its reference numeral is omitted), an imaging lens assembly (its reference numeral is omitted) and a flexible circuit board 180.

The imaging lens assembly, in order from an image side to an object side, includes a plurality of lens elements 151, 152, 153, 154, 155, 156, wherein a portion of a peripheral portion 157 (according to the 1st example, taking the lens element 151 for example) of each of the lens elements 151, 152, 153, 154, 155, 156, which is vertical to an optical axis X, is removed to form a removed portion 158 (according to the 1st example, taking the lens element 151 for example) of each of the lens elements 151, 152, 153, 154, 155, 156. Therefore, the entire volume of the image capturing apparatus can be reduced, and the unnecessary reflection of the stray light inside the image capturing apparatus 10 can be effectively reduced.

In FIG. 1A, the imaging lens driving module, in order from a top to a bottom, includes a molded frame element 120, a lens carrier 130, a driving mechanism (its reference numeral is omitted), a rolling element 160 and a molded receiving base 170, wherein the imaging lens assembly is disposed in the lens carrier 130 of the imaging lens driving module.

In detail, the lens carrier 130 defines the optical axis X, and the lens elements 151, 152, 153, 154, 155, 156 are disposed in the lens carrier 130. The molded receiving base 170 is configured to receive the lens carrier 130. The rolling element 160 is disposed between the lens carrier 130 and the molded receiving base 170, and the lens carrier 130 is allowed to be displaceable along the optical axis X and relatively to the molded receiving base 170. According to the 1st example, a number of the rolling element 160 is four, but the present disclosure is not limited thereto. The molded frame element 120 is coupled with the molded receiving base 170 for defining an inner space 120a to receive the lens carrier 130. The molded receiving base 170 can be a receiving base formed by injecting the plastic material in the mold of the injection molding. The driving mechanism drives the lens carrier 130 displaceable along the optical axis X, and includes a driving magnet 141 and a driving coil 142, wherein the driving magnet 141 is disposed on the lens carrier 130, and the driving coil 142 is corresponding to and faces towards the driving magnet 141.

The lens carrier 130 includes two lateral surfaces, wherein each of the lateral surfaces is a first lateral surface 131 and a second lateral surface 132, the first lateral surface 131 faces towards the molded frame element 120, and the second lateral surface 132 faces towards the molded receiving base 170.

Figure 1C:
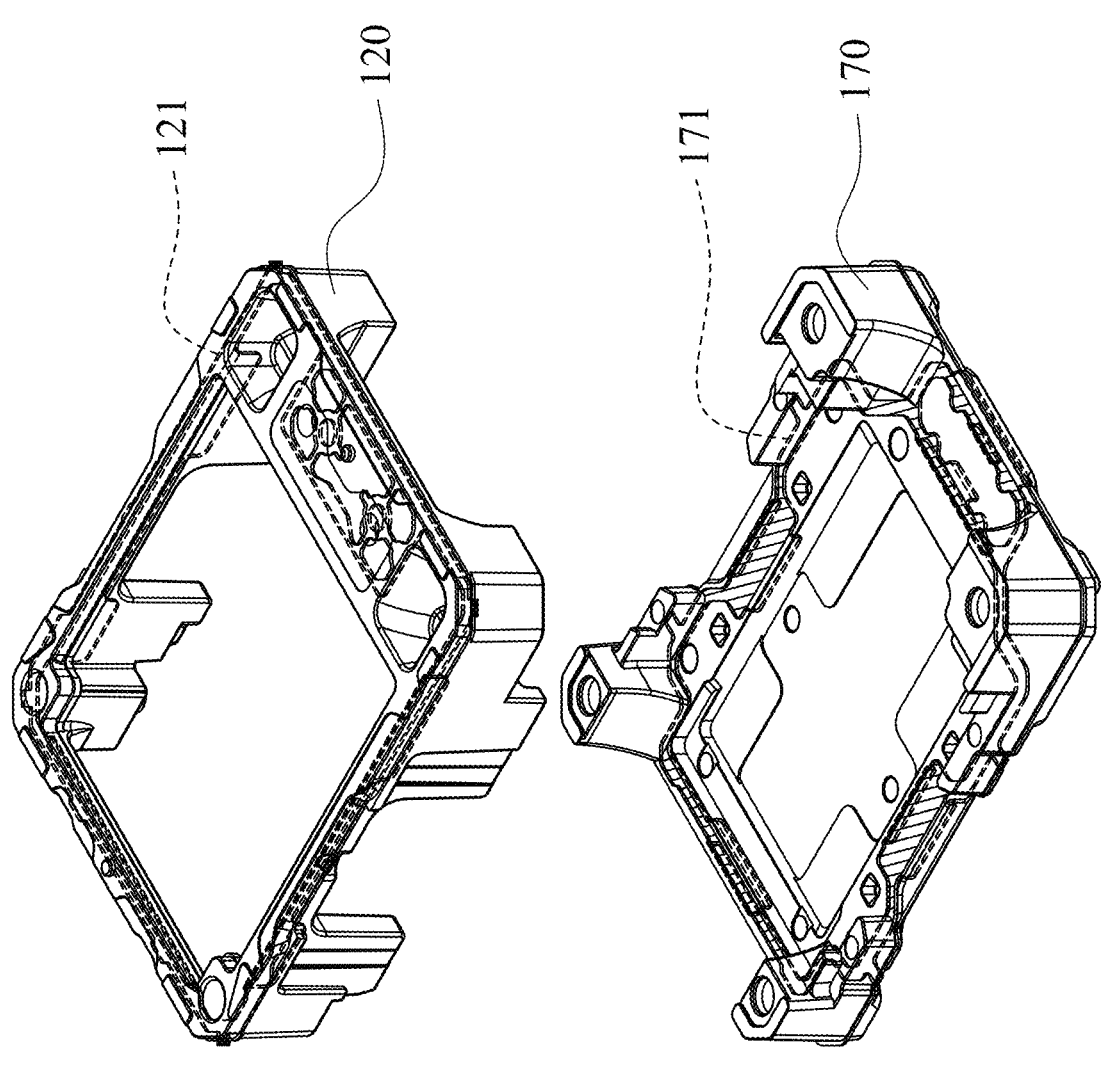
FIG. 1C is an assembling schematic view of the molded frame element with a metal element and the molded receiving base with a metal element according to the 1st example in FIG. 1A.
Figure 1D:
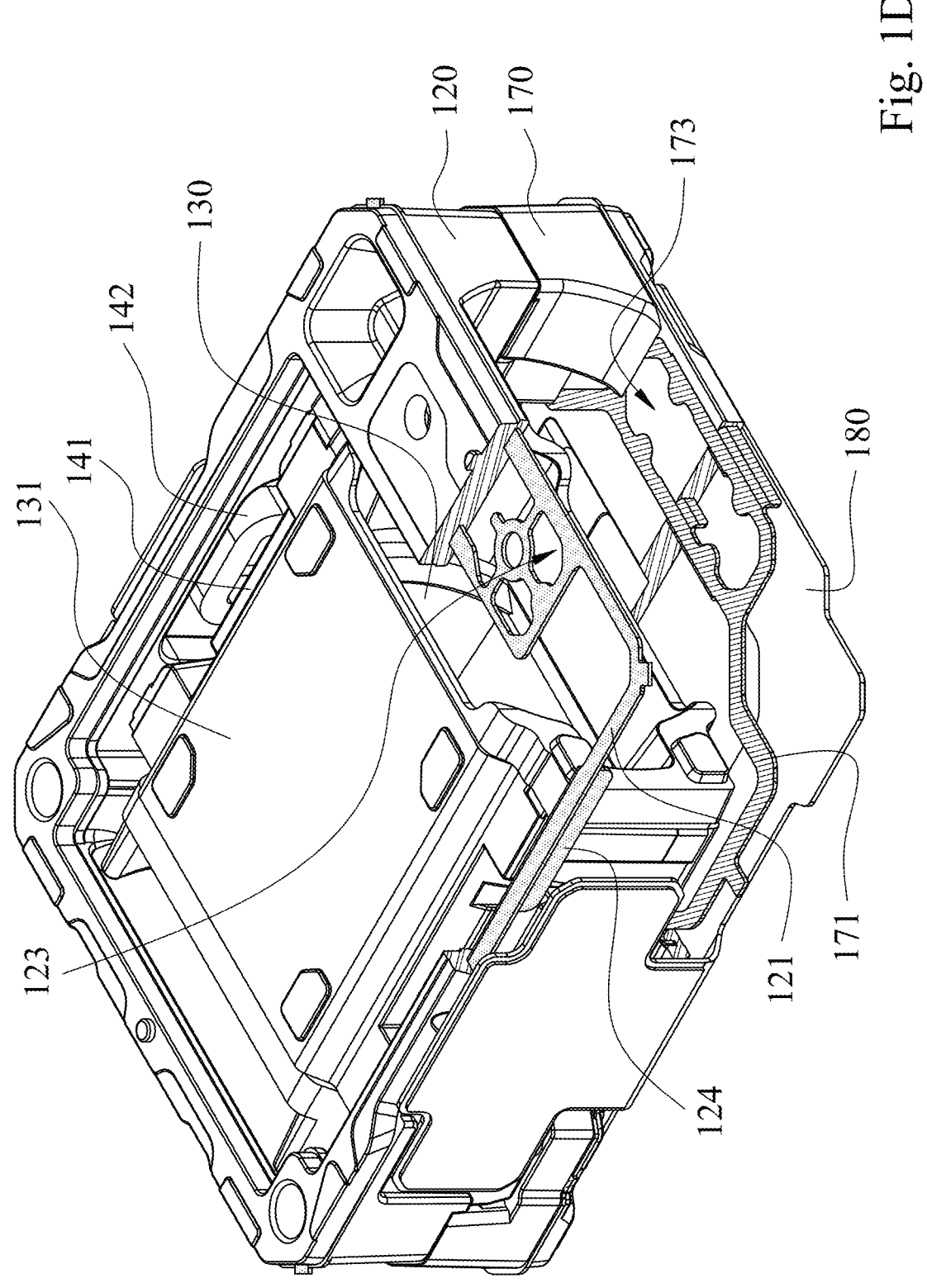
FIG. 1D is a partial assembling schematic view of the imaging lens driving module according to the 1st example in FIG. 1A.
Figure 1E:
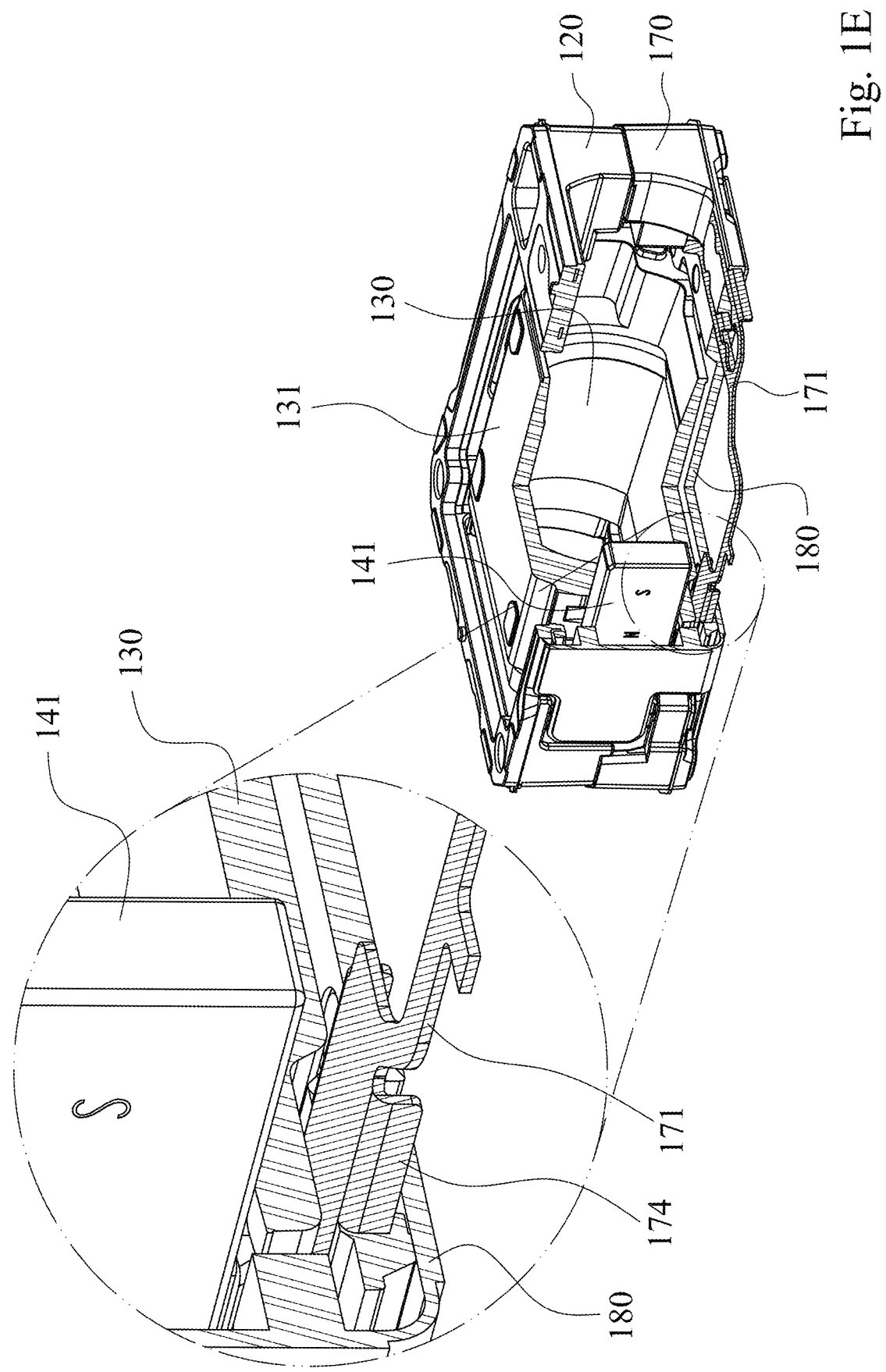
FIG. 1E is a partial cross-sectional view of the imaging lens driving module according to the 1st example in FIG. 1A.

FIG. 1C is an assembling schematic view of the molded frame element 120 with a metal element 121 and the molded receiving base 170 with a metal element 171 according to the 1st example in FIG. 1A. FIG. 1D is a partial assembling schematic view of the imaging lens driving module according to the 1st example in FIG. 1A. FIG. 1E is a partial cross-sectional view of the imaging lens driving module according to the 1st example in FIG. 1A. In FIGS. 1C to 1E, the molded frame element 120 includes the metal element 121, and the molded receiving base 170 includes the metal element 171, wherein the metal element 121 is insert-molded with the molded frame element 120, and the metal element 171 is insert-molded with the molded receiving base 170. Furthermore, both of the metal elements 121, 171 are forming ring-shaped planes, wherein the ring-shaped plane of the metal element 121 faces towards the first lateral surface 131, and the ring-shaped plane of the metal element 171 faces towards the second lateral surface 132. In particular, the ring-shaped planes can be closed or opened, and the ring-shaped planes can also be the annular arrangement of a plurality of individuals separated in a plurality of spaces.

By the metal element 121 insert-molded with the molded frame element 120 and the metal element 171 insert-molded with the molded receiving base 170, the engineering issues such as the warpage, the abnormal contraction, the insufficient strength and the insufficient rigidity of the plastic element can be effectively controlled during the mass production. It should be mentioned that the warpage, the abnormal contraction, the insufficient strength and the insufficient rigidity are easily happened to the plastic element of the conventional art. By insert-molding the metal elements 121, 171, the mass production finished product (that is, the imaging lens driving module) has the significant advantage to smoothly pass the inspection standards for the following environmental test.

Both of the metal elements 121, 171 are with an iron composition, and the proportion of the iron composition is not less than 90%, wherein each of the metal elements 121, 171 is further doped with a little carbon or tungsten to enhance the hardness of each of the metal elements 121, 171 or increase the application range of each of the metal elements 121, 171. Furthermore, the metal elements 121, 171 can be ferromagnetic. By the greater attractive force of the metal elements 121, 171 towards the magnet, the assembling error can be effectively reduced. The aforementioned assembling error can be the problem of the insufficient output force of the machine pressing the components during the manufacturing process. In particular, ferromagnetic means that the attractive force between the magnet and the metal elements 121, 171 is formed when the magnet is close to the metal elements 121, 171.

In detail, the metal elements 121, 171 can be a carbon-containing steel, an iron material with the treatment of enhancing the hardness, a stainless steel or an iron material with ferromagnetism. Further, the metal elements 121, 171 are the iron materials, which the magnetic performance can be affected by the magnet, and the characteristics of the metal elements 121, 171 can be paramagnetic, ferromagnetic or magnetizable, but the present disclosure is not limited thereto. The metal elements 121, 171 can be electrically conductive wires.

In FIG. 1E, a portion of each of the metal elements 121, 171 is corresponding to and faces towards the driving magnet 141. Because the metal elements 121, 171 are ferromagnetic, the attractive force can be formed during the metal elements 121, 171 facing towards the driving magnet 141. Therefore, the preload force of the mechanical system can be maintained by the lens carrier 130 and the molded receiving base 170 close to each other.

In FIG. 1D, the ring-shaped plane of the metal element 121 includes two or more closed rings 123, and the ring-shaped plane of the metal element 171 includes two or more closed rings 173. The closed rings 123, 173 are favorable for maintaining the flatness of the ring-shaped plane, and the flatness of the metal elements 121, 171 insert-molded with the molded frame element 120 and the molded receiving base 170 is hardly damaged during the manufacturing process. Therefore, both of the dimensional accuracy and the structural strength of the molded frame element 120 and the molded receiving base 170 can be better.

In FIGS. 1D and 1E, the metal element 121 includes a fold structure 124, and the metal element 171 includes a fold structure 174, wherein the fold structures 124, 174 are angled and in a striped shape. Moreover, the supporting strength of the metal elements 121, 171 with the fold structures 124, 174 is higher than the supporting strength of the flat metal element without the fold structure, and the thickness of the metal elements 121, 171 can be further reduced to enhance the efficiency of the injection molding of the insert-molding. Therefore, the weight of the metal elements 121, 171 and the volume of the metal elements 121, 171 can be simultaneously reduced under the premise of enhancing the supporting strength. In particular, the angle of each of the fold structures 124, 174 can be 90 degrees, but the present disclosure is not limited thereto.

2nd Example

Figure 2A:
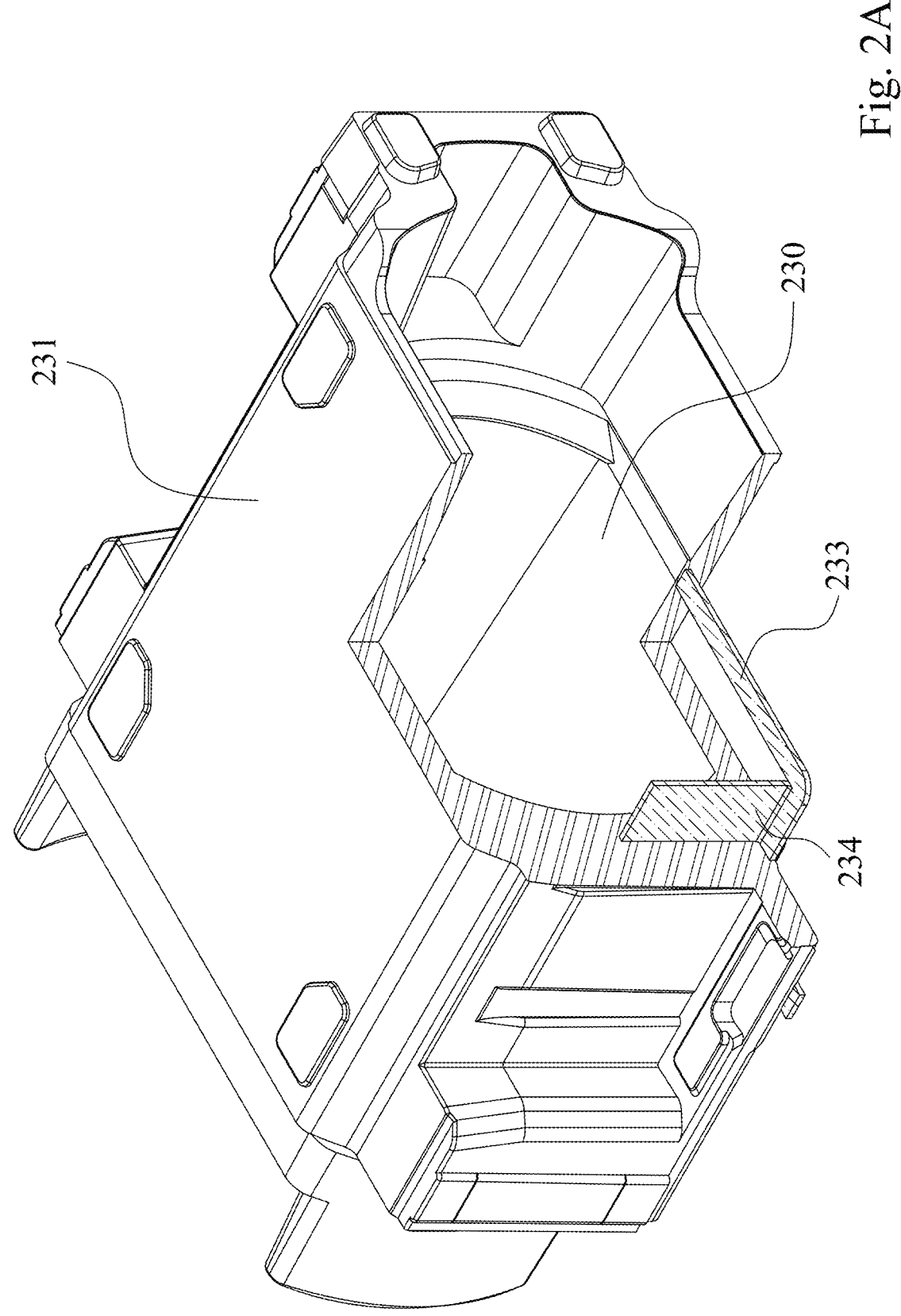
FIG. 2A is a partial cross-sectional view of an imaging lens driving module according to the 2nd example of the present disclosure.
Figure 2B:
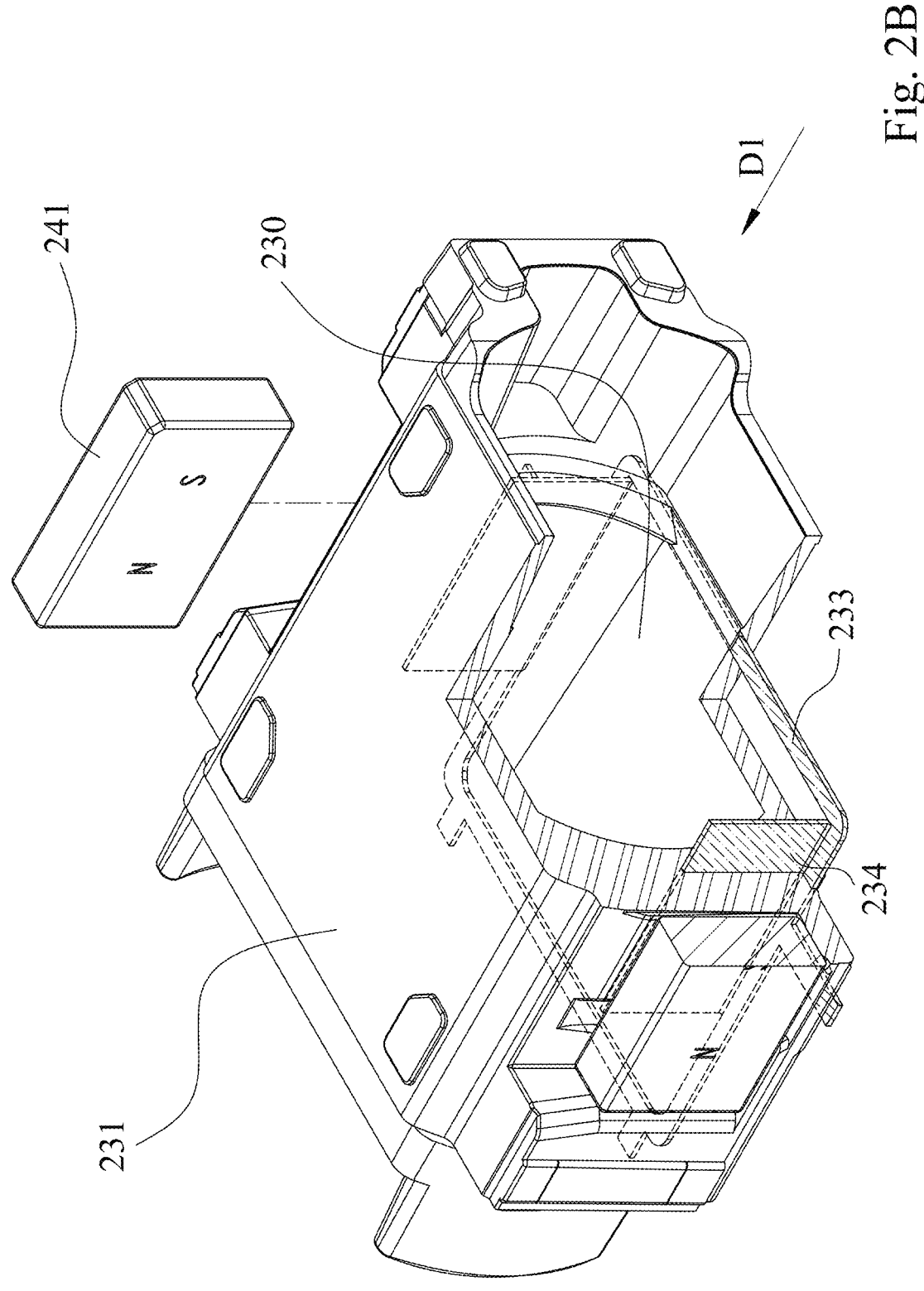
FIG. 2B is a partial assembling schematic view of the imaging lens driving module according to the 2nd example in FIG. 2A.

FIG. 2A is a partial cross-sectional view of an imaging lens driving module according to the 2nd example of the present disclosure. FIG. 2B is a partial assembling schematic view of the imaging lens driving module according to the 2nd example in FIG. 2A. In FIGS. 2A and 2B, the imaging lens driving module (its reference numeral is omitted) includes a molded frame element (not shown), a lens carrier 230, a driving mechanism (its reference numeral is omitted), a rolling element (not shown) and a molded receiving base (not shown).

In detail, the lens carrier 230 defines an optical axis (its reference numeral is omitted), and the molded receiving base is configured to receive the lens carrier 230. The rolling element is disposed between the lens carrier 230 and the molded receiving base, and the lens carrier 230 is allowed to be displaceable along the optical axis. The driving mechanism includes a driving magnet 241 and a driving coil (not shown), wherein the driving magnet 241 is disposed on the lens carrier 230, and the driving coil is corresponding to and faces towards the driving magnet 241.

Figure 2C:
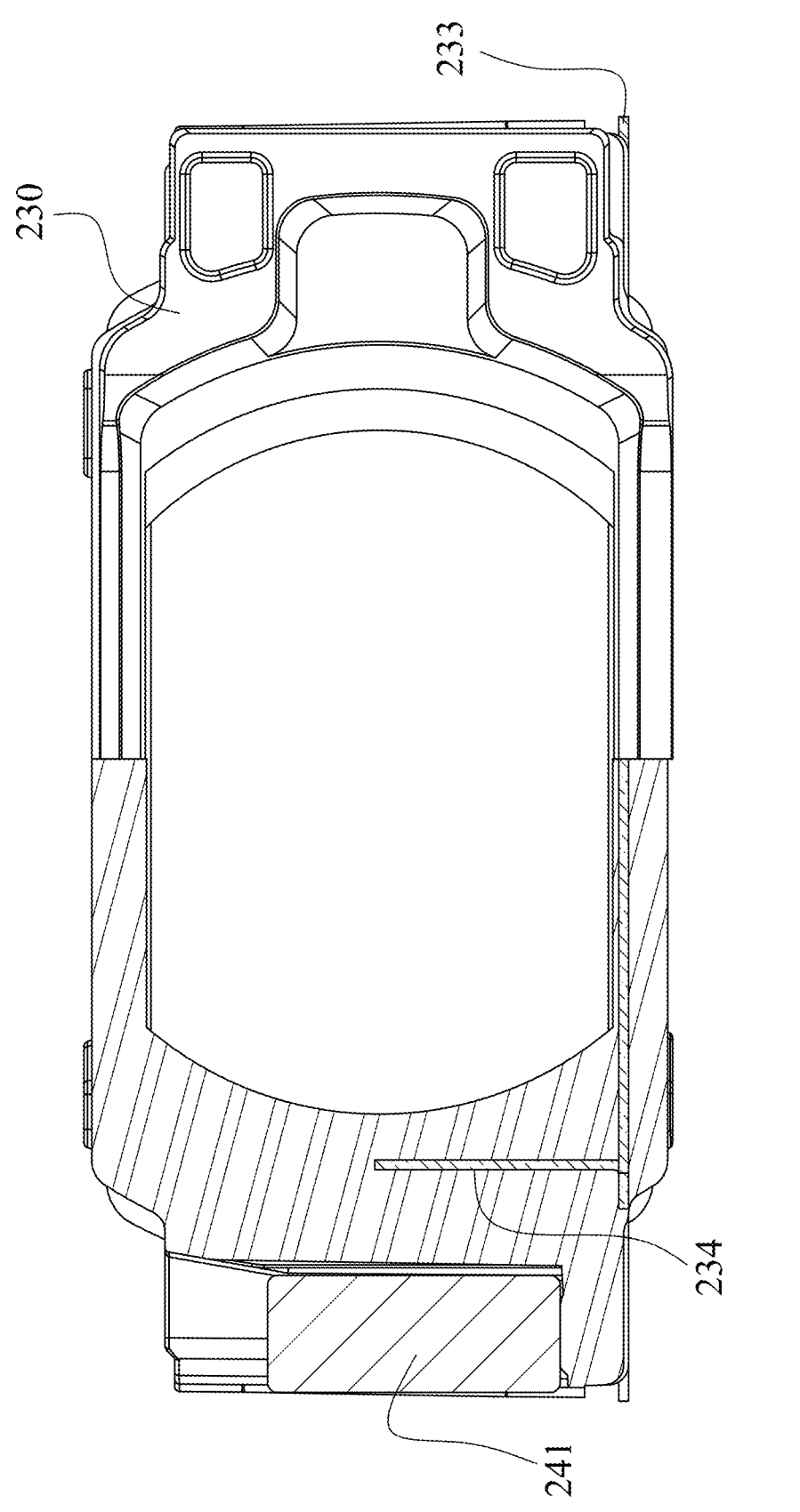
Figures 2D, 2E, 2F, 2G, 2H, 2I:
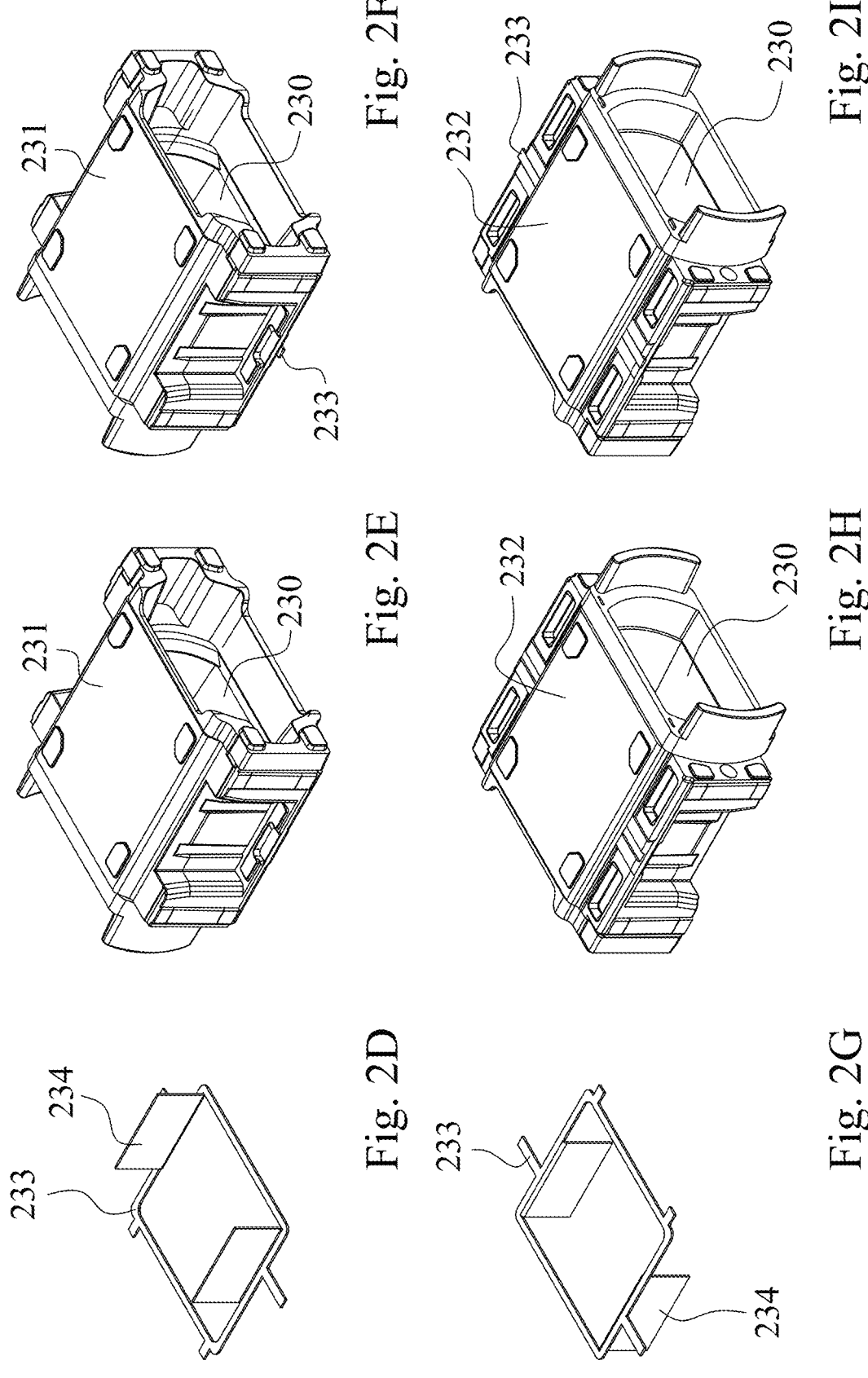
FIG. 2D is a schematic view of the metal element according to the 2nd example in FIG. 2A.
FIG. 2E is a schematic view of the lens carrier according to the 2nd example in FIG. 2A.
FIG. 2F is an assembling schematic view of the lens carrier with the metal element according to the 2nd example in FIG. 2A.
FIG. 2G is another schematic view of the metal element according to the 2nd example in FIG. 2A.
FIG. 2H is another schematic view of the lens carrier according to the 2nd example in FIG. 2A.
FIG. 2I is another assembling schematic view of the lens carrier with the metal element according to the 2nd example in FIG. 2A.

The lens carrier 230 includes two lateral surfaces, wherein each of the lateral surfaces is a first lateral surface 231 and a second lateral surface 232 (as shown in FIG. 2H), the first lateral surface 231 faces towards the molded frame element, and the second lateral surface 232 faces towards the molded receiving base.

FIG. 2C is a partial schematic view of the imaging lens driving module according to the 2nd example in FIG. 2A, wherein FIG. 2C is a schematic view observing along a direction of an arrow D1 in FIG. 2B. FIG. 2D is a schematic view of the metal element 233 according to the 2nd example in FIG. 2A. FIG. 2E is a schematic view of the lens carrier 230 according to the 2nd example in FIG. 2A. FIG. 2F is an assembling schematic view of the lens carrier 230 with the metal element 233 according to the 2nd example in FIG. 2A. FIG. 2G is another schematic view of the metal element 233 according to the 2nd example in FIG. 2A. FIG. 2H is another schematic view of the lens carrier 230 according to the 2nd example in FIG. 2A. FIG. 2I is another assembling schematic view of the lens carrier 230 with the metal element 233 according to the 2nd example in FIG. 2A. In FIGS. 2C to 2I, the lens carrier 230 includes the metal element 233, wherein the metal element 233 is insert-molded with the lens carrier 230. Furthermore, the metal element 233 is forming a ring-shaped plane, wherein the ring-shaped plane faces towards one of the molded frame element and the molded receiving base. In particular, the ring-shaped plane can be closed or opened, and the ring-shaped plane can also be the annular arrangement of a plurality of individuals separated in a plurality of spaces.

By the metal element 233 insert-molded with the lens carrier 230, the engineering issues such as the warpage, the abnormal contraction, the insufficient strength and the insufficient rigidity of the plastic element can be effectively controlled during the mass production. It should be mentioned that the warpage, the abnormal contraction, the insufficient strength and the insufficient rigidity are easily happened to the plastic element of the conventional art. By insert-molding the metal element 233, the mass production finished product (that is, the imaging lens driving module) has the significant advantage to smoothly pass the inspection standards for the following environmental test.

The metal element 233 is with an iron composition, and the proportion of the iron composition is not less than 90%, wherein the metal element 233 is further doped with a little carbon or tungsten to enhance the hardness of the metal element 233 or increase the application range of the metal element 233. Furthermore, the metal element 233 can be ferromagnetic. By the greater attractive force of the metal element 233 towards the magnet, the assembling error can be effectively reduced. The aforementioned assembling error can be the problem of the insufficient output force of the machine pressing the components during the manufacturing process. In particular, ferromagnetic means that the attractive force between the magnet and the metal element 233 is formed when the magnet is close to the metal element 233.

In detail, the metal element 233 can be a carbon-containing steel, an iron material with the treatment of enhancing the hardness, a stainless steel or an iron material with ferromagnetism. Further, the metal element 233 is the iron material, which the magnetic performance can be affected by the magnet, and the characteristic of the metal element 233 can be paramagnetic, ferromagnetic or magnetizable, but the present disclosure is not limited thereto. The metal element 233 can be an electrically conductive wire.

In FIG. 2B, a portion of the metal element 233 is corresponding to the driving magnet 241 on the lens carrier 230, and the portion of the metal element 233 faces towards the driving magnet 241. Because the metal element 233 is ferromagnetic, the attractive force can be formed during the metal element 233 facing towards the driving magnet 241.

In FIGS. 2A to 2D and 2G, the metal element 233 can include a fold structure 234, wherein the fold structure 234 is angled and in a striped shape. Moreover, the supporting strength of the metal element 233 with the fold structure 234 is higher than the supporting strength of the flat metal element without the fold structure, and the thickness of the metal element 233 can be further reduced to enhance the efficiency of the injection molding of the insert-molding. Therefore, the weight of the metal element 233 and the volume of the metal element 233 can be simultaneously reduced under the premise of enhancing the supporting strength.

Further, all of other structures and dispositions according to the 2nd example are the same as the structures and the dispositions according to the 1st example, and will not be described again herein.

3rd Example

Figure 3A:
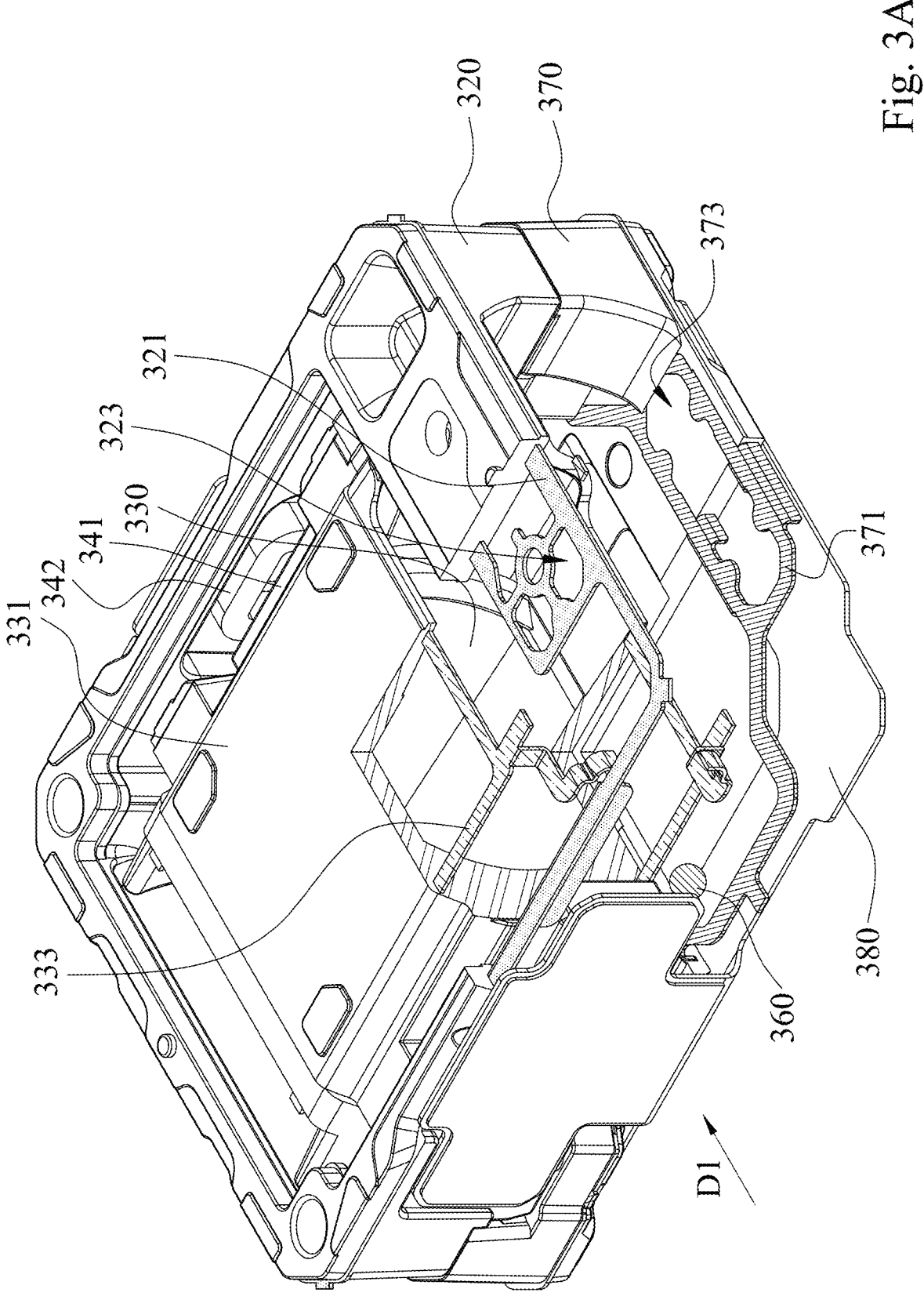
FIG. 3A is a partial cross-sectional view of an imaging lens driving module according to the 3rd example of the present disclosure.

FIG. 3A is a partial cross-sectional view of an imaging lens driving module according to the 3rd example of the present disclosure. In FIG. 3A, the imaging lens driving module (its reference numeral is omitted) includes a molded frame element 320, a lens carrier 330, a driving mechanism (its reference numeral is omitted), a rolling element 360 and a molded receiving base 370.

In detail, the lens carrier 330 defines an optical axis (its reference numeral is omitted), and the molded receiving base 370 is configured to receive the lens carrier 330. The rolling element 360 is disposed between the lens carrier 330 and the molded receiving base 370, and the lens carrier 330 is allowed to be displaceable along the optical axis and relatively to the molded receiving base 370. The molded frame element 320 is coupled with the molded receiving base 370 for defining an inner space (its reference numeral is omitted) to receive the lens carrier 330. The molded receiving base 370 can be a receiving base formed by injecting the plastic material in the mold of the injection molding. The driving mechanism drives the lens carrier 330 displaceable along the optical axis, and includes a driving magnet 341 and a driving coil 342, wherein the driving magnet 341 is disposed on the lens carrier 330, and the driving coil 342 is corresponding to and faces towards the driving magnet 341.

The lens carrier 330 includes two lateral surfaces, wherein each of the lateral surfaces is a first lateral surface 331 and a second lateral surface (its reference numeral is omitted), the first lateral surface 331 faces towards the molded frame element 320, and the second lateral surface faces towards the molded receiving base 370.

Figure 3B:
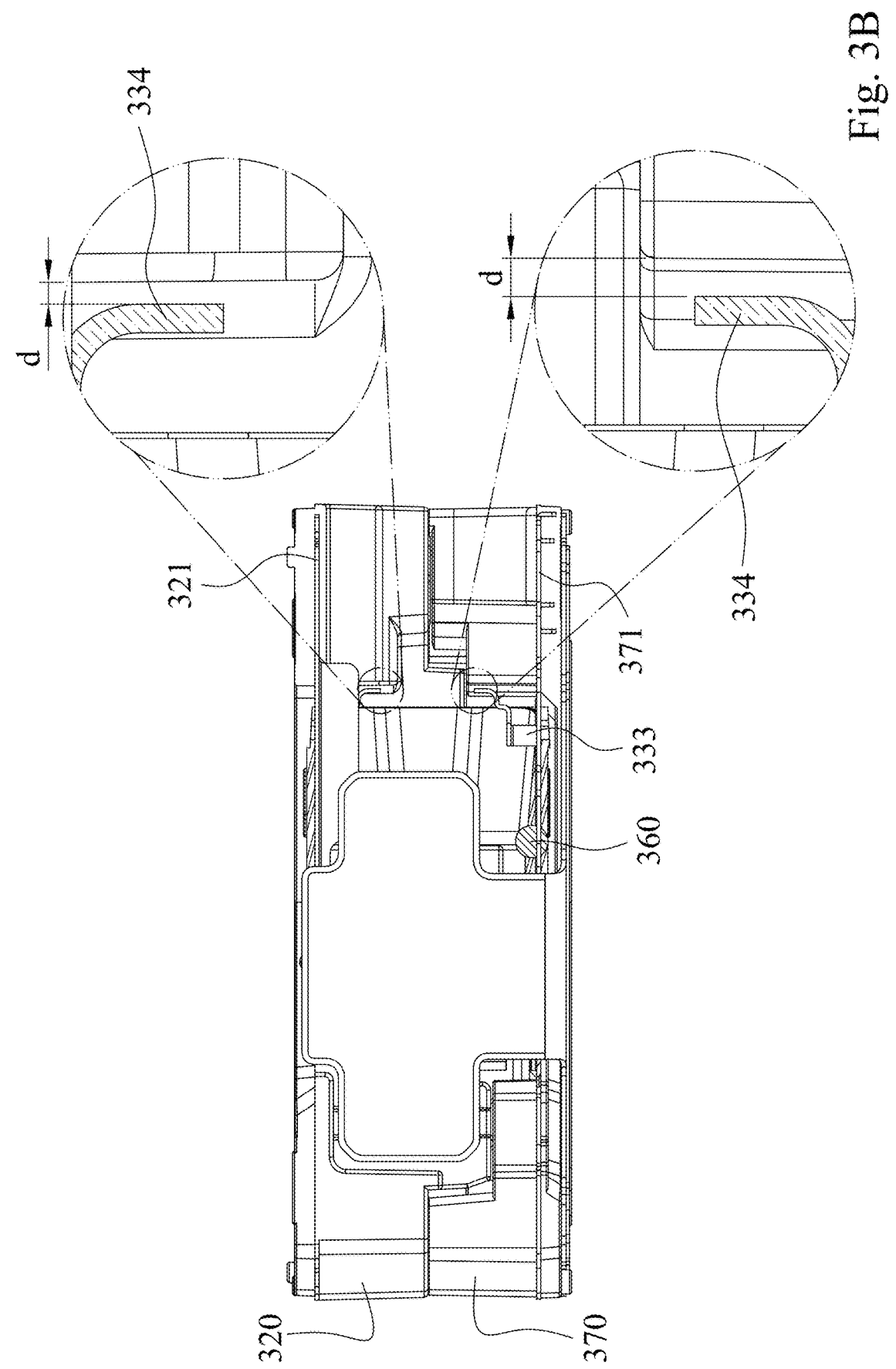
Figure 3C:
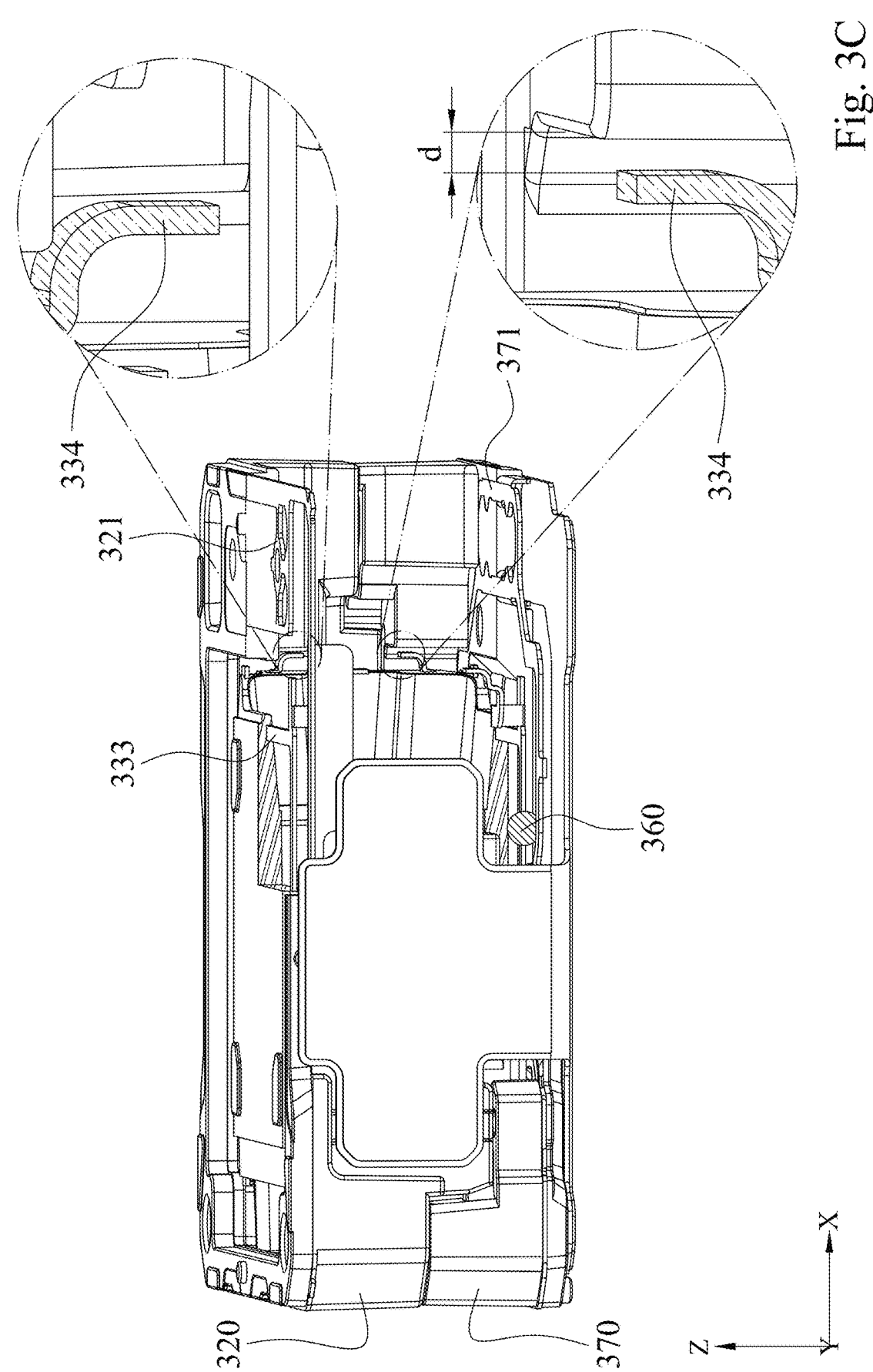
Figure 3D:
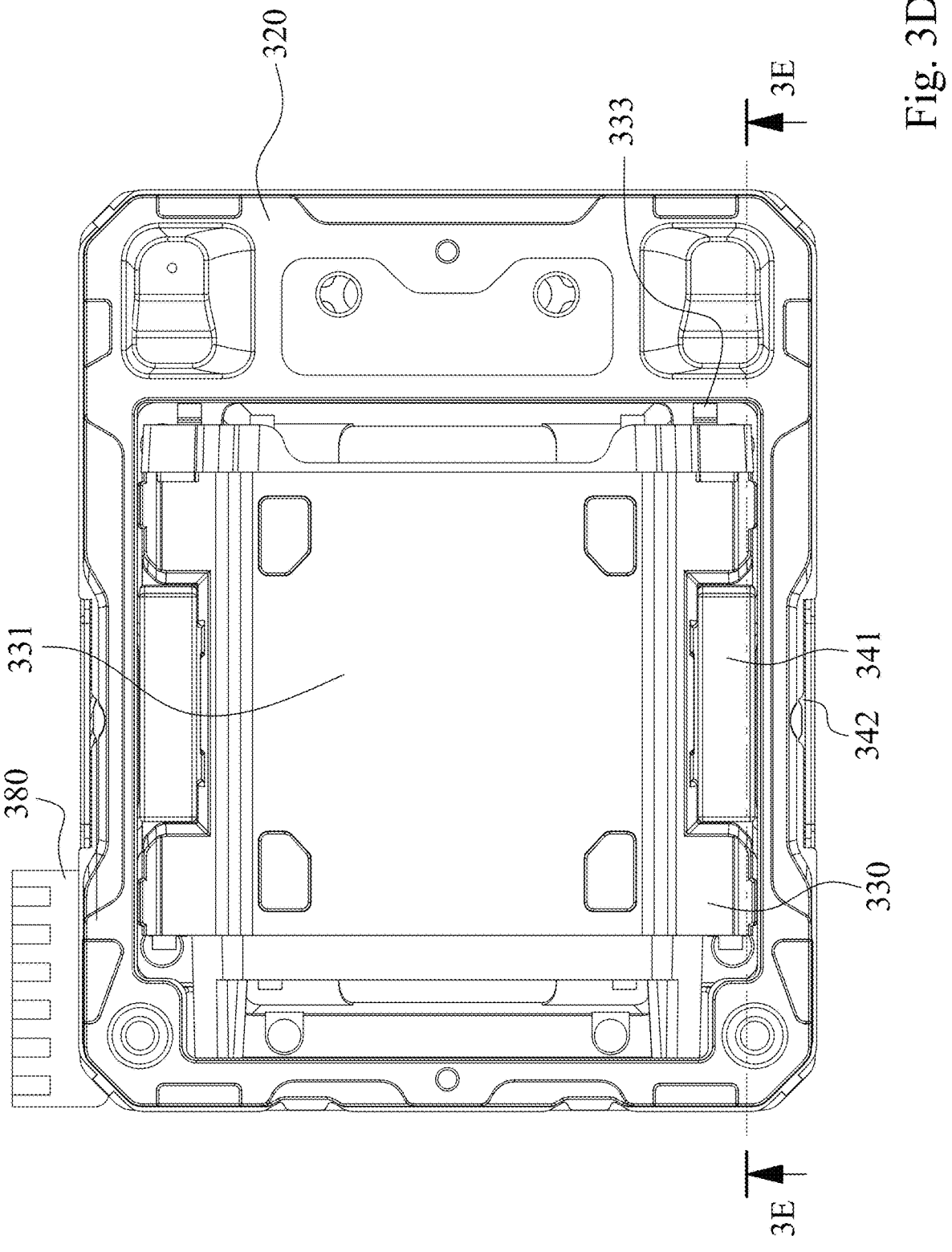
FIG. 3D is a top view of the imaging lens driving module according to the 3rd example in FIG. 3A.
Figure 3E:
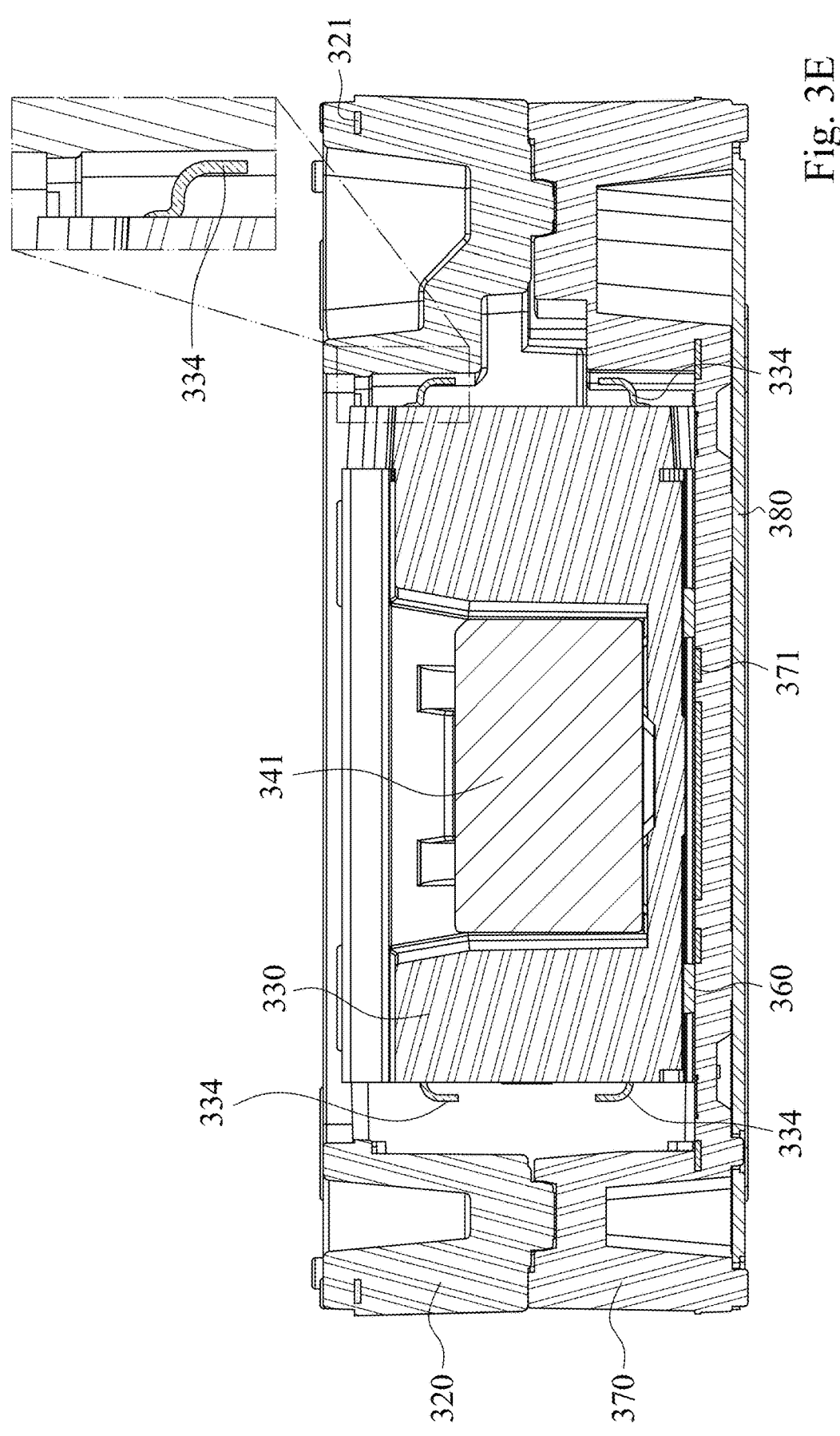
FIG. 3E is a cross-sectional view of the imaging lens driving module along line 3E-3E in FIG. 3D.
Figure 3H:
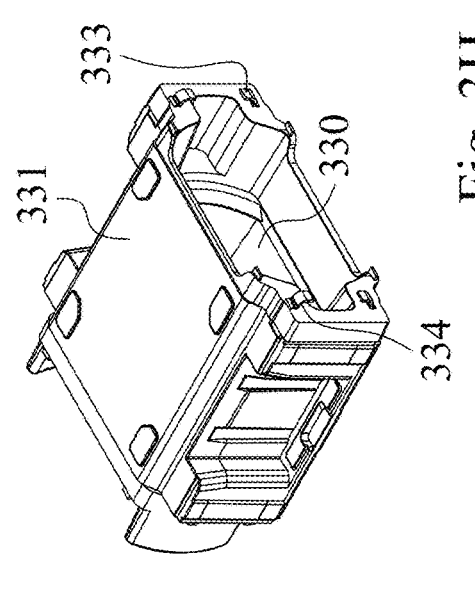
FIG. 3H is an assembling schematic view of the lens carrier with the metal element according to the 3rd example in FIG. 3A.
Figure 3K:
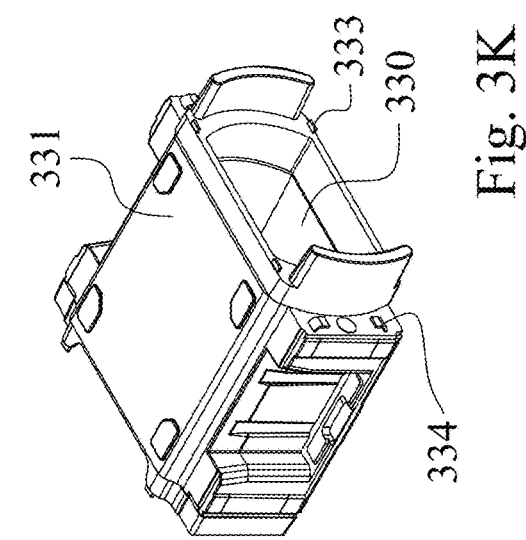
FIG. 3K is another assembling schematic view of the lens carrier with the metal element according to the 3rd example in FIG. 3A.
Figure 3G:
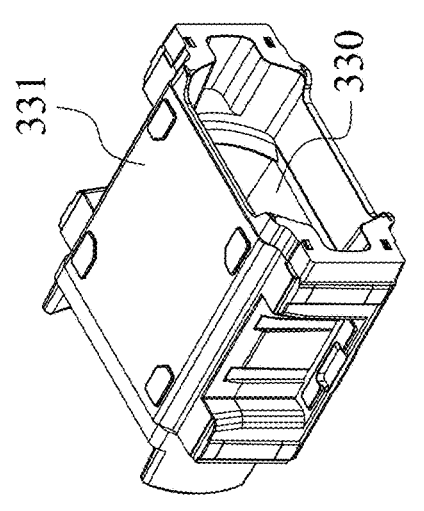
FIG. 3G is a schematic view of the lens carrier according to the 3rd example in FIG. 3A.
Figure 3J:
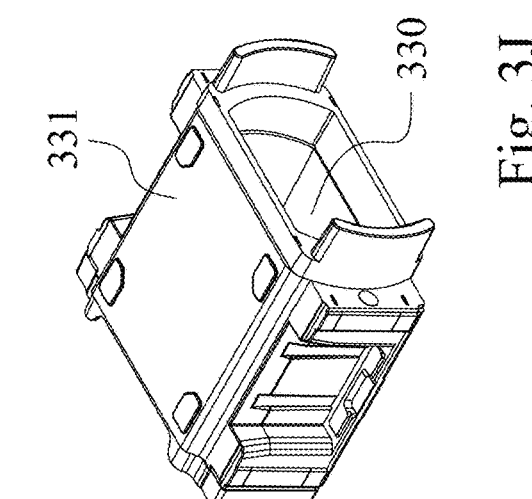
FIG. 3J is another schematic view of the lens carrier according to the 3rd example in FIG. 3A.
Figure 3F:
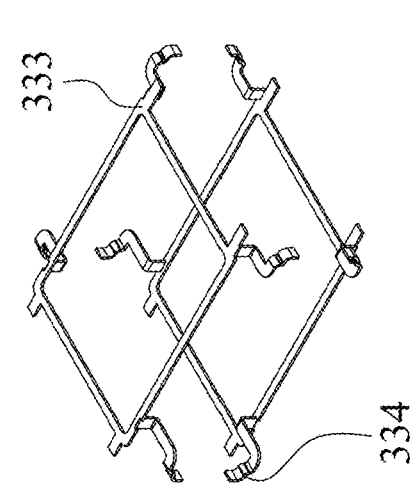
FIG. 3F is a schematic view of the metal element of the lens carrier according to the 3rd example in FIG. 3A.
Figure 3I:
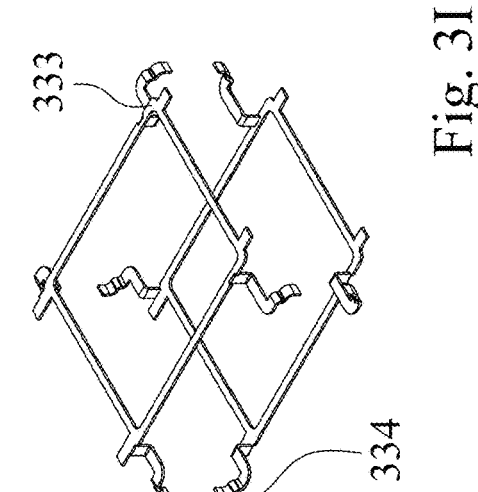
FIG. 3I is another schematic view of the metal element of the lens carrier according to the 3rd example in FIG. 3A.
Figure 3L:
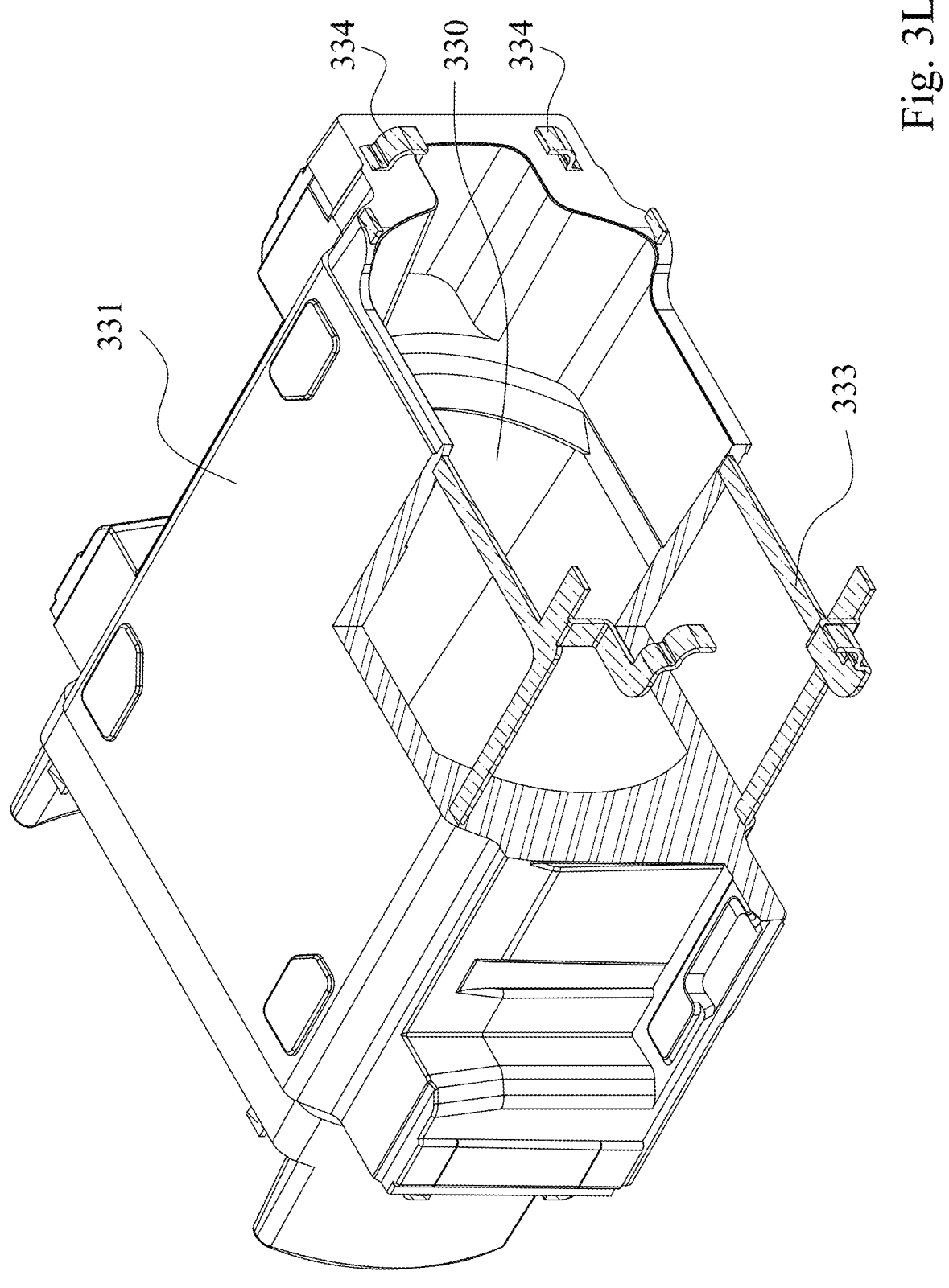
FIG. 3L is a partial cross-sectional view of the lens carrier according to the 3rd example in FIG. 3A.

FIG. 3B is a partial enlarged view of the imaging lens driving module according to the 3rd example in FIG. 3A, wherein FIG. 3B is a schematic view observing along a direction of an arrow D1 in FIG. 3A. FIG. 3C is another partial enlarged view of the imaging lens driving module according to the 3rd example in FIG. 3A, wherein FIG. 3C is a schematic view of FIG. 3B with an X axis rotated by 8 degrees and a Z axis rotated by −2 degrees. FIG. 3D is a top view of the imaging lens driving module according to the 3rd example in FIG. 3A. FIG. 3E is a cross-sectional view of the imaging lens driving module along line 3E-3E in FIG. 3D. FIG. 3F is a schematic view of the metal element 333 of the lens carrier 330 according to the 3rd example in FIG. 3A. FIG. 3G is a schematic view of the lens carrier 330 according to the 3rd example in FIG. 3A. FIG. 3H is an assembling schematic view of the lens carrier 330 with the metal element 333 according to the 3rd example in FIG. 3A. FIG. 3I is another schematic view of the metal element 333 of the lens carrier 330 according to the 3rd example in FIG. 3A. FIG. 3J is another schematic view of the lens carrier 330 according to the 3rd example in FIG. 3A. FIG. 3K is another assembling schematic view of the lens carrier 330 with the metal element 333 according to the 3rd example in FIG. 3A. FIG. 3L is a partial cross-sectional view of the lens carrier 330 according to the 3rd example in FIG. 3A. In FIGS. 3B to 3L, the molded frame element 320 includes a metal element 321, the lens carrier 330 includes a metal element 333, and the molded receiving base 370 includes a metal element 371, wherein the metal element 321 is insert-molded with the molded frame element 320, the metal element 333 is insert-molded with the lens carrier 330, and the metal element 371 is insert-molded with the molded receiving base 370. Furthermore, all of the metal elements 321, 333, 371 are forming ring-shaped planes, wherein the ring-shaped plane of the metal element 321 faces towards the first lateral surface 331, the ring-shaped plane of the metal element 371 faces towards the second lateral surface, and the ring-shaped plane of the metal element 333 faces towards one of the molded receiving base 370 and the molded frame element 320. In particular, a number of the metal element 333 is two, one of the metal elements 333 faces towards the molded receiving base 370, and the other one of the metal elements 333 faces towards the molded frame element 320. Further, the ring-shaped planes can be closed or opened, and the ring-shaped planes can also be the annular arrangement of a plurality of individuals separated in a plurality of spaces.

By the metal element 321 insert-molded with the molded frame element 320, the metal elements 333 insert-molded with the lens carrier 330 and the metal element 371 insert-molded with the molded receiving base 370, the engineering issues such as the warpage, the abnormal contraction, the insufficient strength and the insufficient rigidity of the plastic element can be effectively controlled during the mass production. It should be mentioned that the warpage, the abnormal contraction, the insufficient strength and the insufficient rigidity are easily happened to the plastic element of the conventional art. By insert-molding the metal elements 321, 333, 371, the mass production finished product (that is, the imaging lens driving module) has the significant advantage to smoothly pass the inspection standards for the following environmental test.

All of the metal elements 321, 333, 371 are with an iron composition, and the proportion of the iron composition is not less than 90%, wherein each of the metal elements 321, 333, 371 is further doped with a little carbon or tungsten to enhance the hardness of each of the metal elements 321, 333, 371 or increase the application range of each of the metal elements 321, 333, 371. Furthermore, the metal elements 321, 333, 371 can be ferromagnetic. By the greater attractive force of the metal elements 321, 333, 371 towards the magnet, the assembling error can be effectively reduced. The aforementioned assembling error can be the problem of the insufficient output force of the machine pressing the components during the manufacturing process. In particular, ferromagnetic means that the attractive force between the magnet and the metal elements 321, 333, 371 is formed when the magnet is close to the metal elements 321, 333, 371.

In detail, the metal elements 321, 333, 371 can be a carbon-containing steel, an iron material with the treatment of enhancing the hardness, a stainless steel or an iron material with ferromagnetism. Further, the metal elements 321, 333, 371 are the iron materials, which the magnetic performance can be affected by the magnet, and the characteristics of the metal elements 321, 333, 371 can be paramagnetic, ferromagnetic or magnetizable, but the present disclosure is not limited thereto. The metal elements 321, 333, 371 can be electrically conductive wires.

A portion of each of the metal elements 321, 333, 371 is corresponding to and faces towards the driving magnet 341. Because the metal element 321, 333, 371 are ferromagnetic, the attractive force can be formed during the metal elements 321, 333, 371 facing towards the driving magnet 341. Therefore, the preload force of the mechanical system can be maintained by the lens carrier 330 and the molded receiving base 370 close to each other.

In FIG. 3A, the ring-shaped plane of the metal element 321 includes two or more closed rings 323, and the ring-shaped plane of the metal element 371 includes two or more closed rings 373. The closed rings 323, 373 are favorable for maintaining the flatness of the ring-shaped plane, and the flatness of the metal elements 321, 371 insert-molded with the molded frame element 320 and the molded receiving base 370 is hardly damaged during the manufacturing process. Therefore, both of the dimensional accuracy and the structural strength of the molded frame element 320 and the molded receiving base 370 can be better.

In FIGS. 3B, 3C, 3E and 3L, the portion of the metal element 333 can be corresponding to the driving magnet 341 on the lens carrier 330, and the portion of the metal element 333 faces towards the driving magnet 341. Another portion of the metal element 333 faces towards one of the molded frame element 320 and the molded receiving base 370 to form a collision reduction mechanism 334 for limiting a moving distance of the lens carrier 330 along the optical axis, and another portion of the metal element 333 and one of the molded frame element 320 and the molded receiving base 370 are arranged in order parallel to the optical axis. Therefore, the interference and the collision damage inside the imaging lens driving module can be reduced, and the abnormal sound of the driving mechanism during operating can be reduced. According to the 3rd example, another portion of the metal element 333 close to the first lateral surface 331 faces towards the molded frame element 320, another portion of the metal element 333 close to the second lateral surface faces towards the molded receiving base 370, another portion of the metal element 333 close to the first lateral surface 331 and the molded frame element 320 are arranged in order parallel to the optical axis, and another portion of the metal element 333 close to the second lateral surface and the molded receiving base 370 are arranged in order parallel to the optical axis.

In FIGS. 3B and 3C, the metal element 333 close to the first lateral surface 331 is corresponding to the molded frame element 320, and the metal element 333 close to the second lateral surface is corresponding to the molded receiving base 370. In particular, a determined distance d is between the collision reduction mechanism 334 of the metal element 333 and the molded frame element 320 and between the collision reduction mechanism 334 of the metal element 333 and the molded receiving base 370, respectively. When the determined distance d is less than 0, the collision reduction mechanism 334 is configured to avoid the interference and the collision damage inside the imaging lens driving module.

Further, all of other structures and dispositions according to the 3rd example are the same as the structures and the dispositions according to the 1st example and the 2nd example, and will not be described again herein.

4th Example

Figure 4A:
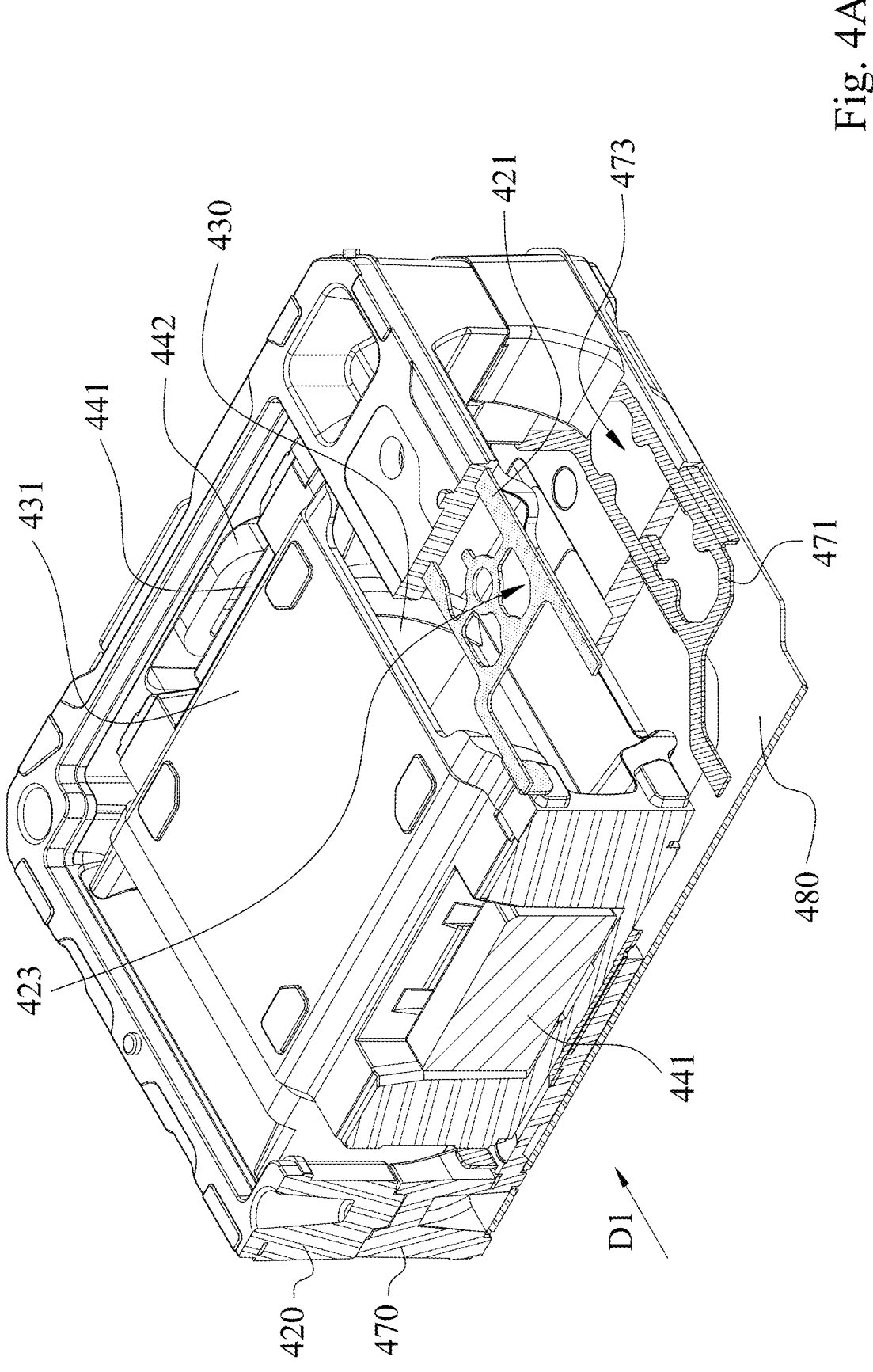
FIG. 4A is a partial assembling schematic view of an imaging lens driving module according to the 4th example of the present disclosure.

FIG. 4A is a partial assembling schematic view of an imaging lens driving module according to the 4th example of the present disclosure. In FIG. 4A, the imaging lens driving module (its reference numeral is omitted) includes a molded frame element 420, a lens carrier 430, a driving mechanism (its reference numeral is omitted), a rolling element 460 (as shown in FIG. 4B) and a molded receiving base 470.

In detail, the lens carrier 430 defines an optical axis (its reference numeral is omitted), and the molded receiving base 470 is configured to receive the lens carrier 430. The rolling element 460 is disposed between the lens carrier 430 and the molded receiving base 470, and the lens carrier 430 is allowed to be displaceable along the optical axis and relatively to the molded receiving base 470. The molded frame element 420 is coupled with the molded receiving base 470 for defining an inner space (its reference numeral is omitted) to receive the lens carrier 430. The molded receiving base 470 can be a receiving base formed by injecting the plastic material in the mold of the injection molding. The driving mechanism drives the lens carrier 430 displaceable along the optical axis, and includes a driving magnet 441 and a driving coil 442, wherein the driving magnet 441 is disposed on the lens carrier 430, and the driving coil 442 is corresponding to and faces towards the driving magnet 441.

The lens carrier 430 includes two lateral surfaces, wherein each of the lateral surfaces is a first lateral surface 431 and a second lateral surface (its reference numeral is omitted), the first lateral surface 431 faces towards the molded frame element 420, and the second lateral surface faces towards the molded receiving base 470.

Figure 4B:
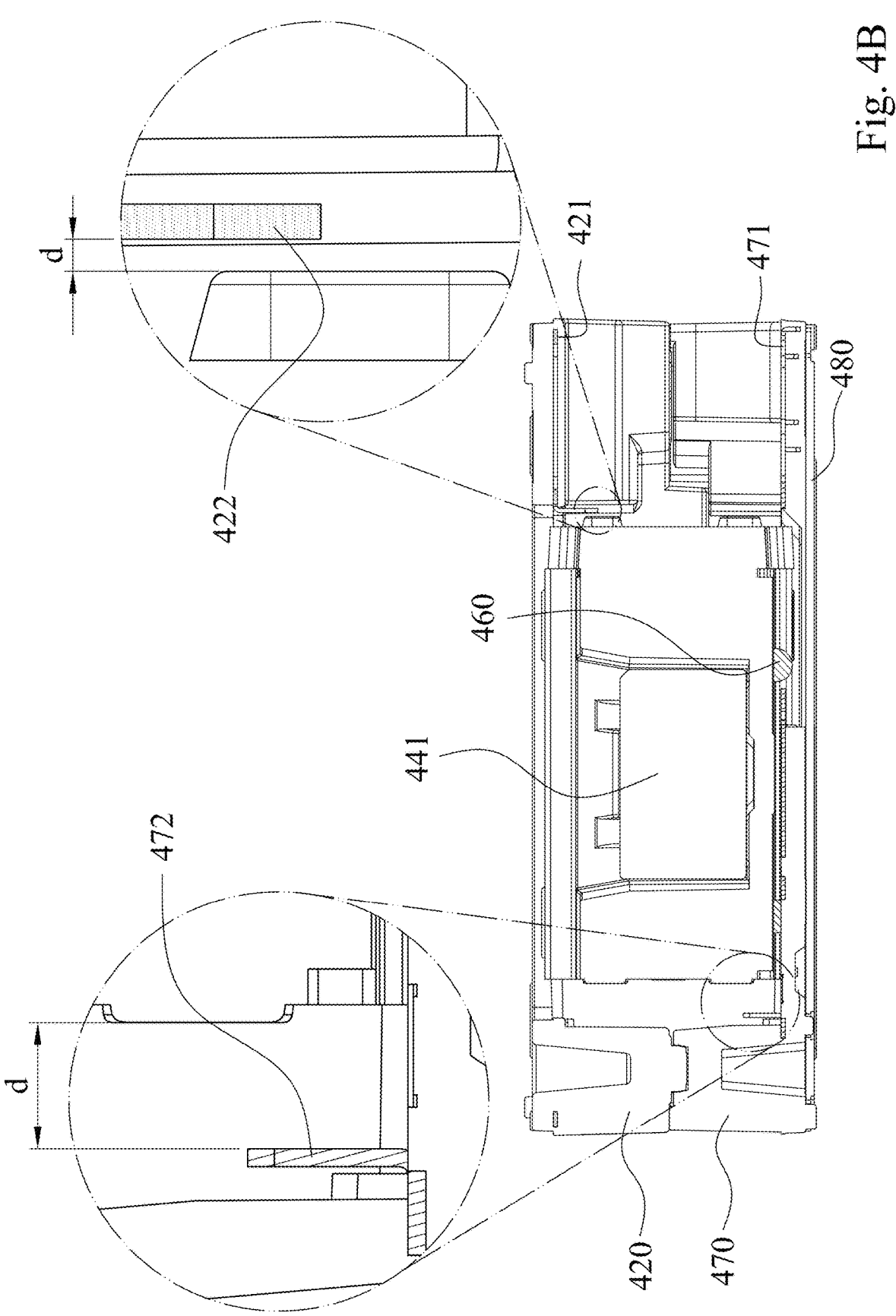
Figure 4C:
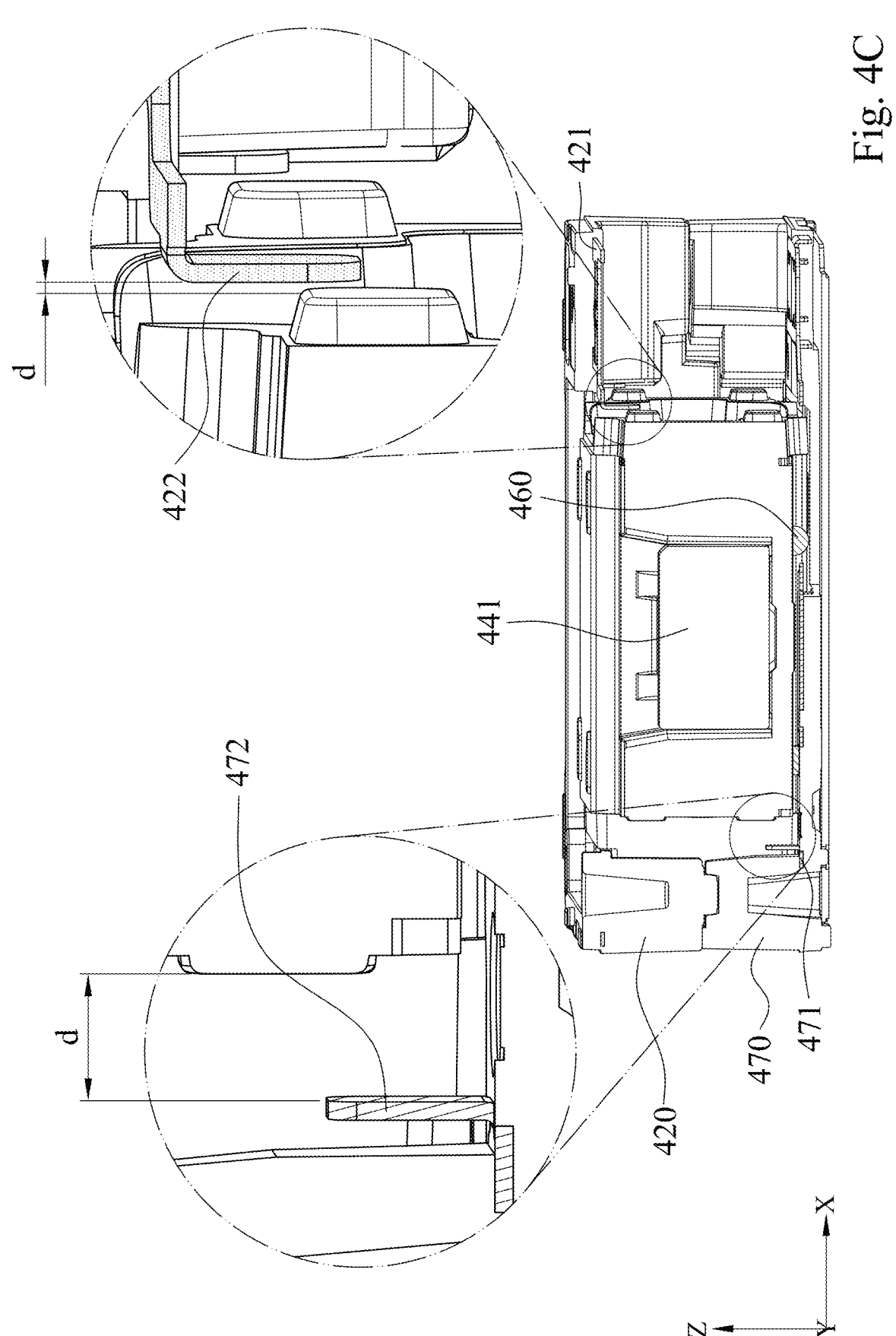
Figure 4D:
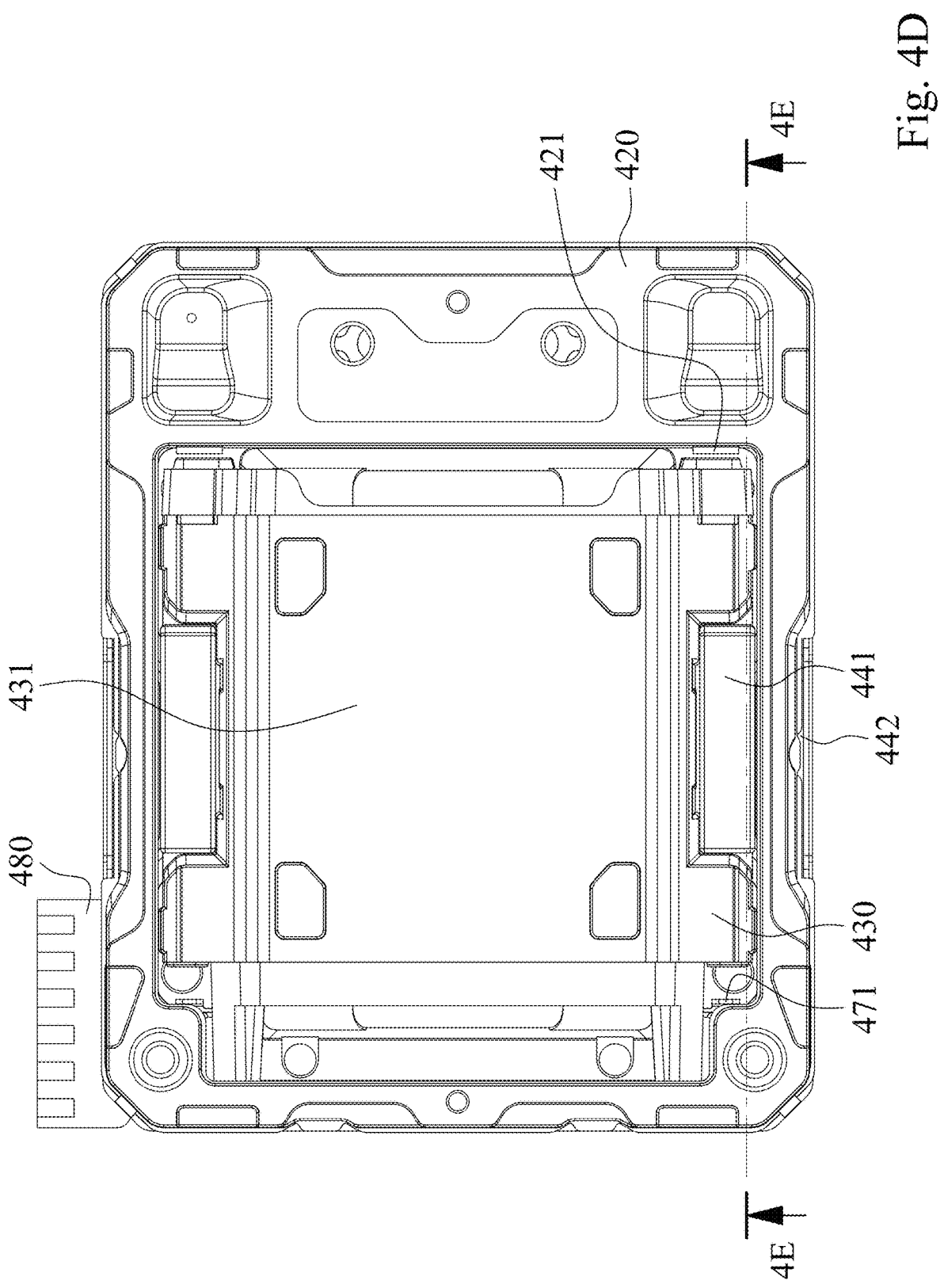
FIG. 4D is a top view of the imaging lens driving module according to the 4th example in FIG. 4A.
Figure 4E:
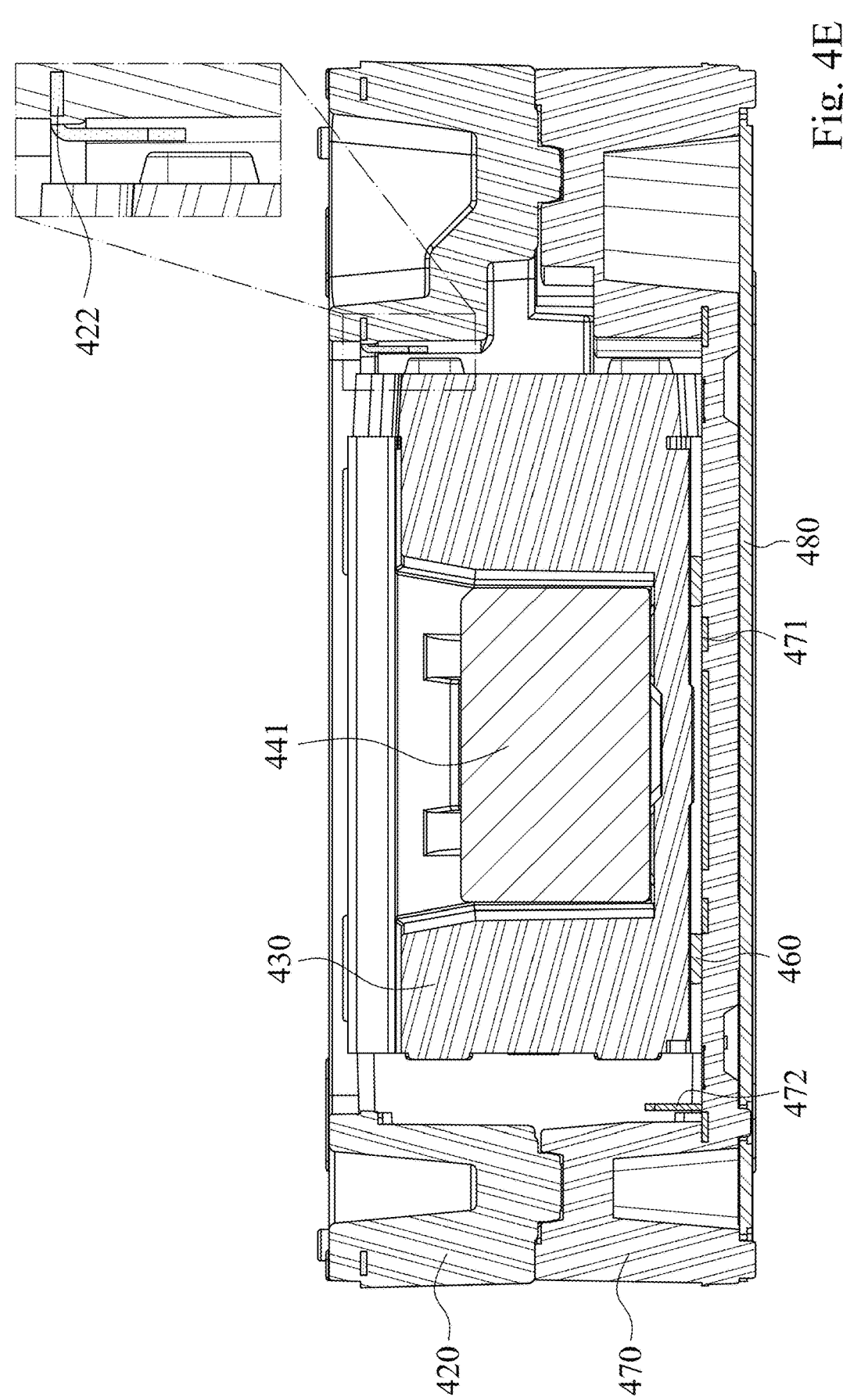
FIG. 4E is a cross-sectional view of the imaging lens driving module along line 4E-4E in FIG. 4D.

FIG. 4B is a partial enlarged view of the imaging lens driving module according to the 4th example in FIG. 4A, wherein FIG. 4B is a schematic view observing along a direction of an arrow D1 in FIG. 4A. FIG. 4C is another partial enlarged view of the imaging lens driving module according to the 4th example in FIG. 4A, wherein FIG. 4C is a schematic view of FIG. 4B with an X axis rotated by 2 degrees and a Z axis rotated by −3 degrees. FIG. 4D is a top view of the imaging lens driving module according to the 4th example in FIG. 4A. FIG. 4E is a cross-sectional view of the imaging lens driving module along line 4E-4E in FIG. 4D.

Figures 4F, 4G, 4H, 4I, 4J, 4K:
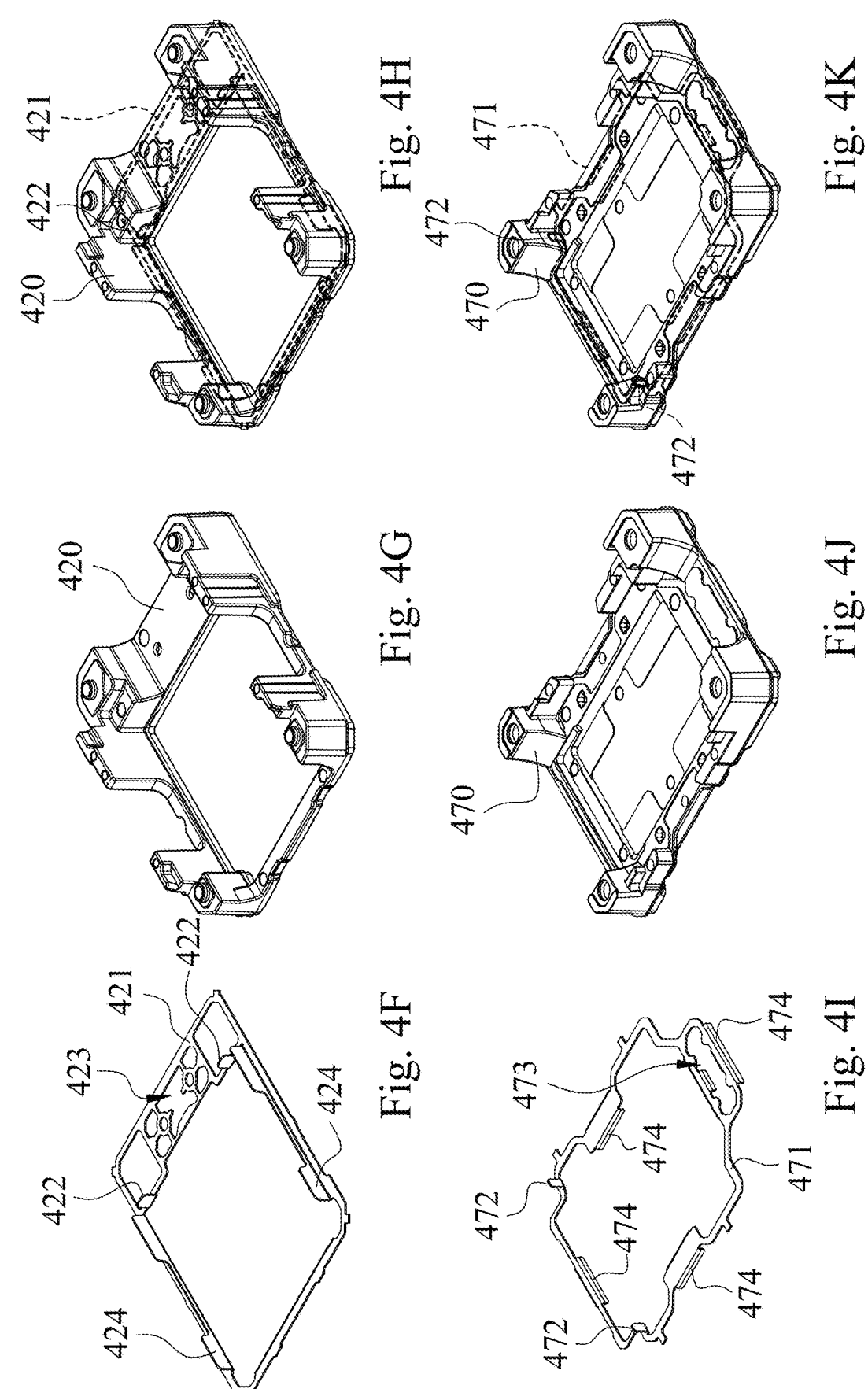
FIG. 4F is a schematic view of the metal element of the molded frame element according to the 4th example in FIG. 4A.
FIG. 4G is a schematic view of the molded frame element according to the 4th example in FIG. 4A.
FIG. 4H is an assembling schematic view of the molded frame element with the metal element according to the 4th example in FIG. 4A.
FIG. 4I is a schematic view of the metal element of the molded receiving base according to the 4th example in FIG. 4A.
FIG. 4J is a schematic view of the molded receiving base according to the 4th example in FIG. 4A.
FIG. 4K is an assembling schematic view of the molded receiving base with the metal element according to the 4th example in FIG. 4A.

FIG. 4F is a schematic view of the metal element 421 of the molded frame element 420 according to the 4th example in FIG. 4A. FIG. 4G is a schematic view of the molded frame element 420 according to the 4th example in FIG. 4A. FIG. 4H is an assembling schematic view of the molded frame element 420 with the metal element 421 according to the 4th example in FIG. 4A. FIG. 4I is a schematic view of the metal element 471 of the molded receiving base 470 according to the 4th example in FIG. 4A. FIG. 4J is a schematic view of the molded receiving base 470 according to the 4th example in FIG. 4A. FIG. 4K is an assembling schematic view of the molded receiving base 470 with the metal element 471 according to the 4th example in FIG. 4A. In FIGS. 4B to 4K, the molded frame element 420 includes a metal element 421, and the molded receiving base 470 includes a metal element 471, wherein the metal element 421 is insert-molded with the molded frame element 420, and the metal element 471 is insert-molded with the molded receiving base 470. Furthermore, both of the metal elements 421, 471 are forming ring-shaped planes, wherein the ring-shaped plane of the metal element 421 faces towards the first lateral surface 431, and the ring-shaped plane of the metal element 471 faces towards the second lateral surface. In particular, the ring-shaped planes can be closed or opened, and the ring-shaped planes can also be the annular arrangement of a plurality of individuals separated in a plurality of spaces.

By the metal element 421 insert-molded with the molded frame element 420, and the metal element 471 insert-molded with the molded receiving base 470, the engineering issues such as the warpage, the abnormal contraction, the insufficient strength and the insufficient rigidity of the plastic element can be effectively controlled during the mass production. It should be mentioned that the warpage, the abnormal contraction, the insufficient strength and the insufficient rigidity are easily happened to the plastic element of the conventional art. By insert-molding the metal elements 421, 471, the mass production finished product (that is, the imaging lens driving module) has the significant advantage to smoothly pass the inspection standards for the following environmental test.

Both of the metal elements 421, 471 are with an iron composition, and the proportion of the iron composition is not less than 90%, wherein each of the metal elements 421, 471 is further doped with a little carbon or tungsten to enhance the hardness of each of the metal elements 421, 471 or increase the application range of each of the metal elements 421, 471. Furthermore, the metal elements 421, 471 can be ferromagnetic. By the greater attractive force of the metal elements 421, 471 towards the magnet, the assembling error can be effectively reduced. The aforementioned assembling error can be the problem of the insufficient output force of the machine pressing the components during the manufacturing process. In particular, ferromagnetic means that the attractive force between the magnet and the metal elements 421, 471 is formed when the magnet is close to the metal elements 421, 471.

In detail, the metal elements 421, 471 can be a carbon-containing steel, an iron material with the treatment of enhancing the hardness, a stainless steel or an iron material with ferromagnetism. Further, the metal elements 421, 471 are the iron materials, which the magnetic performance can be affected by the magnet, and the characteristics of the metal elements 421, 471 can be paramagnetic, ferromagnetic or magnetizable, but the present disclosure is not limited thereto. The metal elements 421, 471 can be electrically conductive wires.

A portion of each of the metal elements 421, 471 is corresponding to and faces towards the driving magnet 441. Because the metal elements 421, 471 are ferromagnetic, the attractive force can be formed during the metal elements 421, 471 facing towards the driving magnet 441. Therefore, the preload force of the mechanical system can be maintained by the lens carrier 430 and the molded receiving base 470 close to each other.

In FIGS. 4B, 4C, 4E, 4F, 4H, 4I and 4K, another portion of the metal element 421 faces towards the lens carrier 430 to form a collision reduction mechanism 422, and another portion of the metal element 471 faces towards the lens carrier 430 to form a collision reduction mechanism 472, wherein the collision reduction mechanisms 422, 472 are configured to limit a moving distance of the lens carrier 430 along the optical axis, and another portions (that are, the collision reduction mechanisms 422, 472) of the metal elements 421, 471 and the lens carrier 430 are arranged in order parallel to the optical axis. Therefore, the interference and the collision damage inside the imaging lens driving module can be reduced, and the abnormal sound of the driving mechanism during operating can be reduced.

In FIGS. 4B and 4C, the metal elements 421, 471 are corresponding to the lens carrier 430. In particular, a determined distance d is between the collision reduction mechanism 422 of the metal element 421 and the lens carrier 430 and between the collision reduction mechanism 472 of the metal element 471 and the lens carrier 430, respectively. When the determined distance d is less than 0, the collision reduction mechanisms 422, 472 are configured to avoid the interference and the collision damage inside the imaging lens driving module.

In FIGS. 4F and 4I, the ring-shaped planes of the metal elements 421, 471 include two or more closed rings, respectively. In detail, the ring-shaped plane of the metal element 421 includes ten closed rings 423, and the ring-shaped plane of the metal element 471 includes two closed rings 473. The closed rings 423, 473 are favorable for maintaining the flatness of the ring-shaped plane, and the flatness of the metal elements 421, 471 insert-molded with the molded frame element 420 and the molded receiving base 470 is hardly damaged during the manufacturing process. Therefore, both of the dimensional accuracy and the structural strength of the molded frame element 420 and the molded receiving base 470 can be better.

In FIGS. 4F and 4I, the metal element 421 can include a fold structure 424, and the metal element 471 includes a fold structure 474, wherein the fold structures 424, 474 are angled and in a striped shape. Moreover, the supporting strength of the metal elements 421, 471 with the fold structures 424, 474 is higher than the supporting strength of the flat metal element without the fold structure, and the thickness of the metal elements 421, 471 can be further reduced to enhance the efficiency of the injection molding of the insert-molding. Therefore, the weight of the metal elements 421, 471 and the volume of the metal elements 421, 471 can be simultaneously reduced under the premise of enhancing the supporting strength. In particular, the angle of each of the fold structures 424, 474 can be 90 degrees, but the present disclosure is not limited thereto.

Further, all of other structures and dispositions according to the 4th example are the same as the structures and the dispositions according to the 1st example, and will not be described again herein.

5th Example

Figure 5A:
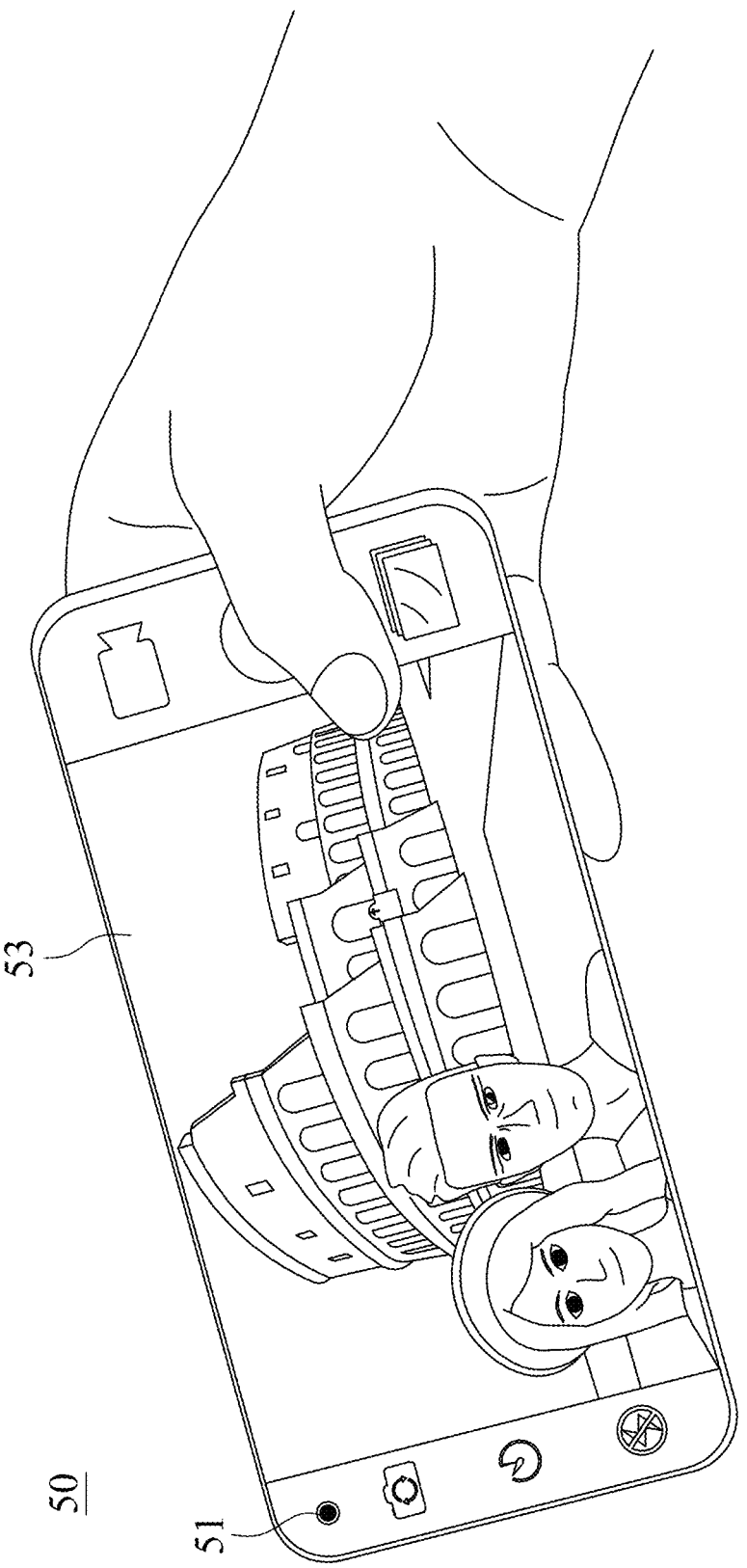
FIG. 5A is a schematic view of an electronic device according to the 5th example of the present disclosure.

FIG. 5A is a schematic view of an electronic device 50 according to the 5th example of the present disclosure. FIG.

Figure 5B:
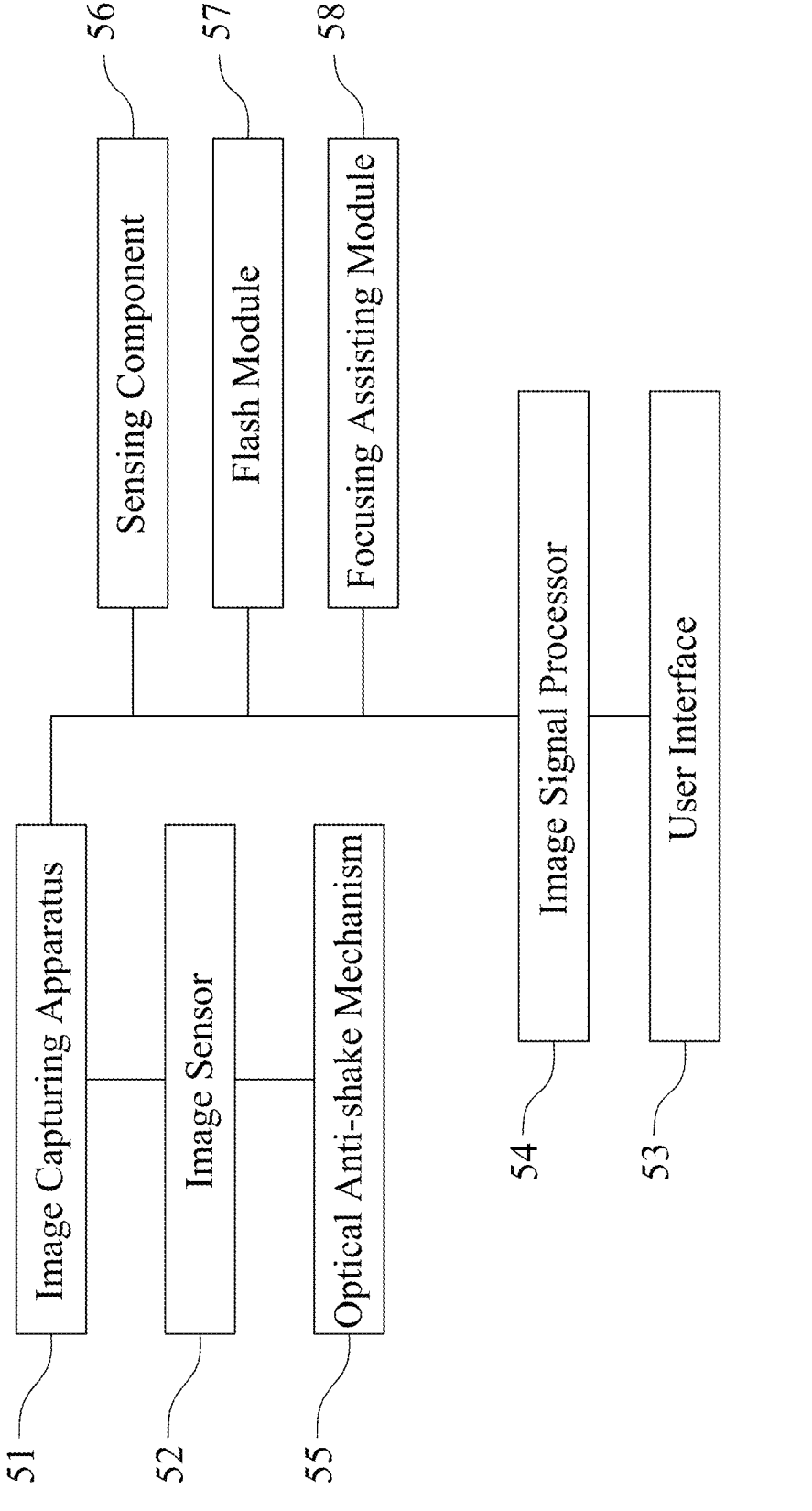
FIG. 5B is a block diagram of the electronic device according to the 5th example in FIG. 5A.

5B is a block diagram of the electronic device 50 according to the 5th example in FIG. 5A. In FIGS. 5A and 5B, the electronic device 50 is a smart phone, and includes an image capturing apparatus 51, an image sensor 52 and a user interface 53, the image capturing apparatus 51 includes an imaging lens driving module (not shown) and an imaging lens assembly (not shown). The image capturing apparatus 51 according to the 5th example is disposed on an area of side of the user interface 53, wherein the user interface 53 can be a touch screen or a display screen, but is not limited thereto. The image capturing apparatus 51 can be one of the image capturing apparatus according to the aforementioned 1st example to the 4th example, but the present disclosure is not limited thereto.

Moreover, users enter a shooting mode via the user interface 53 of the electronic device 50. At this moment, the imaging light is gathered on the image sensor 52 via the image capturing apparatus 51, and an electronic signal about an image is output to an image signal processor (ISP) 54.

To meet a specification of a camera of the electronic device 50, the electronic device 50 can further include an optical anti-shake mechanism 55, which can be an optical image stabilization (OIS). Furthermore, the electronic device 50 can further include at least one auxiliary optical element (its reference numeral is omitted) and at least one sensing element 56. According to the 5th example, the auxiliary optical element is a flash module 57 and a focusing assisting module 58. The flash module 57 can be configured to compensate a color temperature, and the focusing assisting module 58 can be an infrared distance measurement component, a laser focus module, etc. The sensing element 56 can have functions for sensing physical momentum and kinetic energy, such as an accelerator, a gyroscope, a Hall Effect Element, to sense shaking or jitters applied by hands of the user or external environments. Accordingly, the image capturing apparatus 51 of the electronic device 50 equipped with an auto-focusing mechanism and the optical anti-shake mechanism 55 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

Figure 5C:
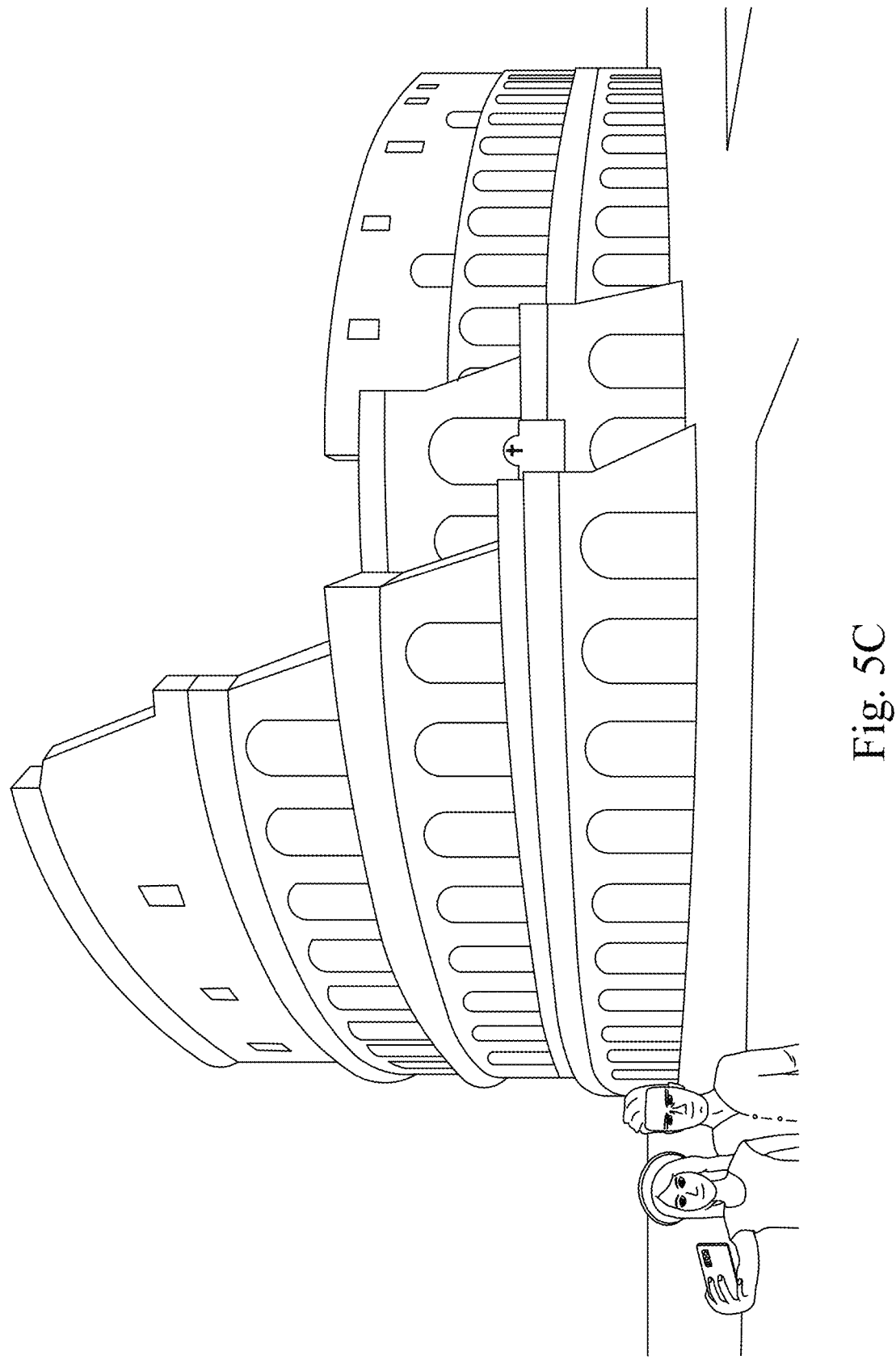
FIG. 5C is a schematic view of a selfie scene according to the 5th example in FIG. 5A.
Figure 5D:
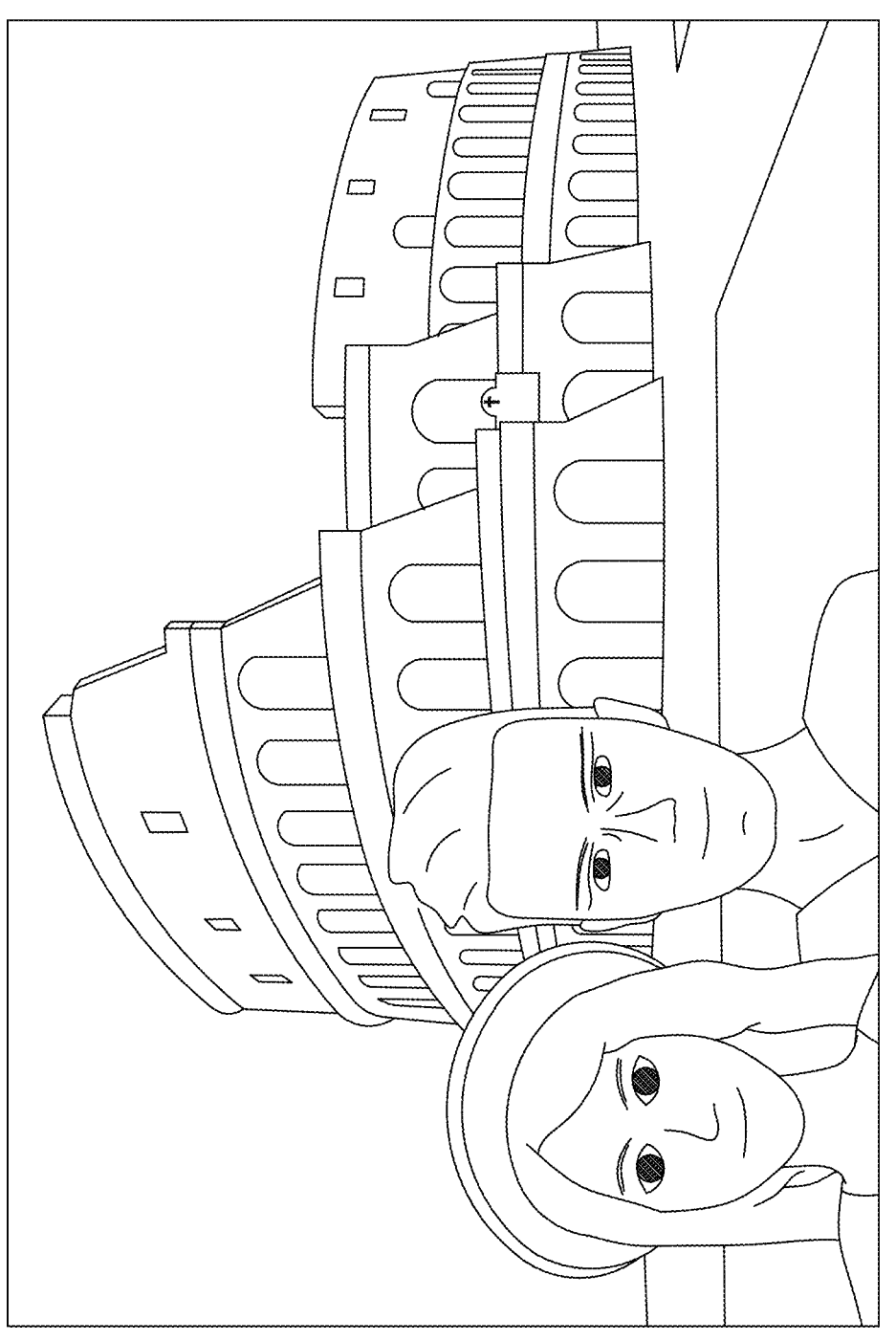
FIG. 5D is a schematic view of a captured image according to the 5th example in FIG. 5A.

FIG. 5C is a schematic view of a selfie scene according to the 5th example in FIG. 5A. FIG. 5D is a schematic view of a captured image according to the 5th example in FIG. 5A. In FIGS. 5A to 5D, both of the image capturing apparatus 51 and the user interface 53 face towards the users. When proceeding selfie or live streaming, the users can watch a captured image and operate an interface at the same time, and the capture image as FIG. 5D can be obtained after shooting. Therefore, better shooting experience can be provided via the image capturing apparatus 51 of the present disclosure.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens driving module, comprising:
a lens carrier defining an optical axis;
a molded receiving base configured to receive the lens carrier;
a rolling element disposed between the lens carrier and the molded receiving base, and the lens carrier allowed to be displaceable along the optical axis and relatively to the molded receiving base;
a molded frame element coupled with the molded receiving base for defining an inner space to receive the lens carrier; and
a driving mechanism driving the lens carrier displaceable along the optical axis, and comprising:
a driving magnet disposed on the lens carrier; and
a driving coil corresponding to and facing towards the driving magnet;
wherein the lens carrier comprises a lateral surface facing towards the molded receiving base, the driving magnet is disposed on the lateral surface;
wherein the molded receiving base comprises a metal element which is a magnetic element, the metal element is insert-molded with the molded receiving base, the metal element is forming a plane, and the plane faces towards the lateral surface.

2. The imaging lens driving module of claim 1, wherein a portion of the metal element is corresponding to the driving magnet, and the portion of the metal element faces towards the driving magnet.

3. The imaging lens driving module of claim 1, wherein a portion of the metal element faces towards the lens carrier to form a collision reduction mechanism for limiting a moving distance of the lens carrier along the optical axis, and the portion of the metal element and the lens carrier are arranged in order parallel to the optical axis.

4. The imaging lens driving module of claim 1, wherein the metal element comprises a fold structure, and the fold structure is angled and in a striped shape.

5. An image capturing apparatus, comprising:
the imaging lens driving module of claim 1; and
an imaging lens assembly disposed in the lens carrier of the imaging lens driving module.

6. The image capturing apparatus of claim 5, wherein the imaging lens assembly comprises a plurality of lens elements disposed in the lens carrier, and a portion of a peripheral portion of each of the lens elements, which is vertical to the optical axis, is removed to form a removed portion of each of the lens elements.

7. An electronic device, comprising:
the image capturing apparatus of claim 5; and
an image sensor disposed on an image surface of the imaging lens assembly.

8. An imaging lens driving module, comprising:
a lens carrier defining an optical axis;
a molded receiving base configured to receive the lens carrier;

a rolling element disposed between the lens carrier and the molded receiving base, and the lens carrier allowed to be displaceable along the optical axis and relatively to the molded receiving base;
a molded frame element coupled with the molded receiving base for defining an inner space to receive the lens carrier; and
a driving mechanism driving the lens carrier displaceable along the optical axis, and comprising:
a driving magnet disposed on the lens carrier; and
a driving coil corresponding to and facing towards the driving magnet;
wherein the lens carrier comprises a lateral surface facing towards the molded frame element, the driving magnet is disposed on the lateral surface;
wherein the molded frame element comprises a metal element which is a magnetic element, the metal element is insert-molded with the molded frame element, the metal element is forming a plane, and the plane faces towards the lateral surface.

9. The imaging lens driving module of claim 8, wherein a portion of the metal element faces towards the lens carrier to form a collision reduction mechanism for limiting a moving distance of the lens carrier along the optical axis, and the portion of the metal element and the lens carrier are arranged in order parallel to the optical axis.

10. The imaging lens driving module of claim 8, wherein the metal element comprises a fold structure, and the fold structure is angled and in a striped shape.

11. An imaging lens driving module, comprising:
a lens carrier defining an optical axis;
a molded receiving base configured to receive the lens carrier;
a rolling element disposed between the lens carrier and the molded receiving base, and the lens carrier allowed to be displaceable along the optical axis and relatively to the molded receiving base;
a molded frame element coupled with the molded receiving base for defining an inner space to receive the lens carrier; and
a driving mechanism driving the lens carrier displaceable along the optical axis, and comprising:
a driving magnet disposed on the lens carrier; and
a driving coil corresponding to and facing towards the driving magnet;
wherein the lens carrier comprises a metal element which is a magnetic element, the metal element is insert-molded with the lens carrier, the metal element is forming a plane, and the plane faces towards one of the molded receiving base and the molded frame element.

12. The imaging lens driving module of claim 11, wherein a portion of the metal element is corresponding to the driving magnet disposed on the lens carrier, and the portion of the metal element faces towards the driving magnet.

13. The imaging lens driving module of claim 11, wherein a portion of the metal element faces towards the one of the molded receiving base and the molded frame element to form a collision reduction mechanism for limiting a moving distance of the lens carrier along the optical axis, and the portion of the metal element and the one of the molded receiving base and the molded frame element are arranged in order parallel to the optical axis.

14. An image capturing apparatus, comprising:
the imaging lens driving module of claim 11; and
an imaging lens assembly disposed in the lens carrier of the imaging lens driving module.

15. The image capturing apparatus of claim 14, wherein the imaging lens assembly comprises a plurality of lens elements disposed in the lens carrier, and a portion of a peripheral portion of each of the lens elements, which is vertical to the optical axis, is removed to form a removed portion of each of the lens elements.

* * * * *